(12) United States Patent
Ishida et al.

(10) Patent No.: US 10,458,552 B2
(45) Date of Patent: Oct. 29, 2019

(54) VALVE AND MANUFACTURING METHOD FOR VALVE

(71) Applicant: SEIKO EPSON CORPORATION, Tokyo (JP)

(72) Inventors: Yukimasa Ishida, Shiojiri (JP); Kenji Ochiai, Azumino (JP); Taiki Hanagami, Matsumoto (JP); Daisuke Noguchi, Matsumoto (JP); Hironori Matsuoka, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/662,418

(22) Filed: Jul. 28, 2017

(65) Prior Publication Data

US 2018/0058588 A1   Mar. 1, 2018

(30) Foreign Application Priority Data

Aug. 31, 2016   (JP) ................... 2016-168965

(51) Int. Cl.
*B41J 2/175*   (2006.01)
*F16K 1/12*   (2006.01)
(Continued)

(52) U.S. Cl.
CPC ............... *F16K 1/12* (2013.01); *B41J 2/175* (2013.01); *B41J 2/17509* (2013.01); *B41J 2/17596* (2013.01); *C09D 5/00* (2013.01); *F16K 7/12* (2013.01); *F16K 27/02* (2013.01); *F16K 27/10* (2013.01); *F16K 99/0005* (2013.01);
(Continued)

(58) Field of Classification Search
CPC ........ F16K 27/02; F16K 27/04; F16K 27/041; F16K 25/00; F16K 25/005; F16K 25/02; F16K 1/2263; F16K 1/24; F16K 1/42; F16K 1/465; F16K 7/12; F16K 7/20; B41J 2/17596
See application file for complete search history.

(56) References Cited

U.S. PATENT DOCUMENTS

2003/0146958 A1   8/2003   Aruga et al.
2011/0235477 A1*   9/2011   Hiranuma ............ G04B 37/02
368/291
(Continued)

FOREIGN PATENT DOCUMENTS

JP   2004-142405 A   5/2004
JP   2007-076226 A   3/2007
(Continued)

*Primary Examiner* — Scott A Richmond
(74) *Attorney, Agent, or Firm* — Workman Nydegger

(57) ABSTRACT

A valve includes a valve seat having a hole configured as a flow path, a valve body configured to open/close the flow path due to relative movement with respect to the valve seat, an opening member having a first surface fixed to one of the valve seat and the valve body, a second surface configured to separate away and abut the other one of the valve seat and the valve body, a third surface which intersects the first and second surfaces, and an opening penetrating the first and second surfaces, a fixing member that fixes the first surface to the one of the valve seat and the valve body, and an inclined portion, which makes an interval between the one of the valve seat and the valve body and the first surface long in a direction from the opening to the third surface.

11 Claims, 19 Drawing Sheets

(51) Int. Cl.
  *C09D 5/00* (2006.01)
  *F16K 7/12* (2006.01)
  *F16K 27/02* (2006.01)
  *F16K 27/10* (2006.01)
  *F16K 99/00* (2006.01)

(52) U.S. Cl.
  CPC .. *F16K 99/0057* (2013.01); *F16K 2099/0073* (2013.01); *F16K 2099/0092* (2013.01)

(56) References Cited

U.S. PATENT DOCUMENTS

| | | |
|---|---|---|
| 2013/0161422 A1 | 6/2013 | Miyajima et al. |
| 2015/0144826 A1* | 5/2015 | Bayyouk ............... F16K 25/005 251/359 |
| 2016/0023464 A1* | 1/2016 | Nakao .................. B41J 2/1433 347/45 |

FOREIGN PATENT DOCUMENTS

| | | |
|---|---|---|
| JP | 2008-036837 A | 2/2008 |
| JP | 4155324 B | 7/2008 |
| JP | 2010-208049 A | 9/2010 |
| JP | 2011-051271 A | 3/2011 |
| JP | 2013-111894 A | 6/2013 |
| JP | 2013-132895 A | 7/2013 |
| JP | 5321154 B | 7/2013 |
| JP | 2016-022704 A | 2/2016 |

\* cited by examiner

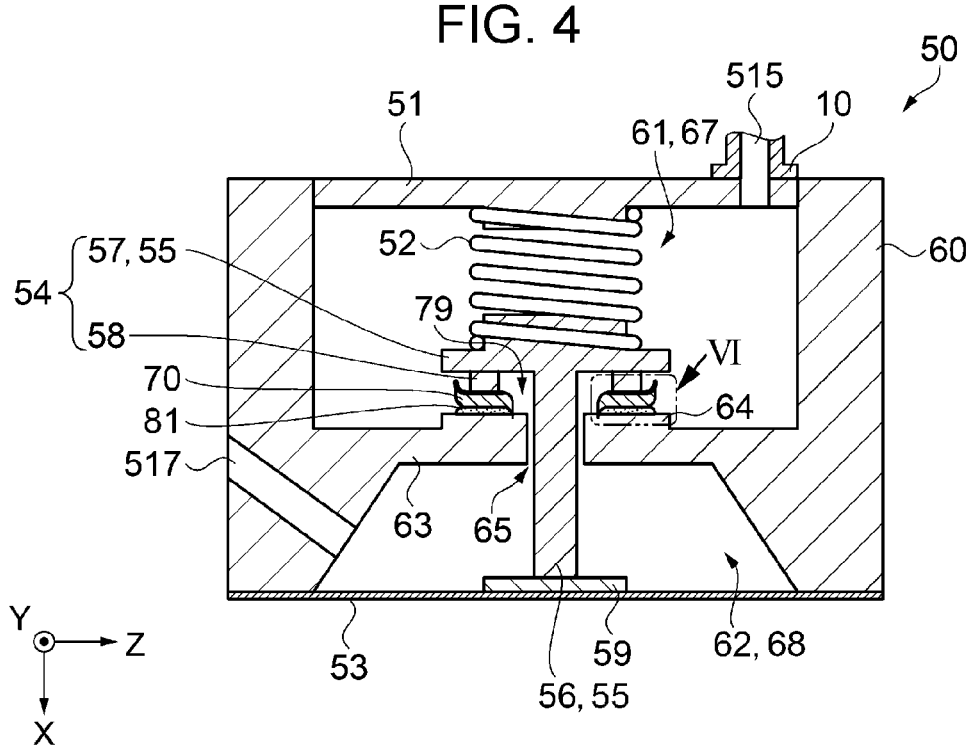
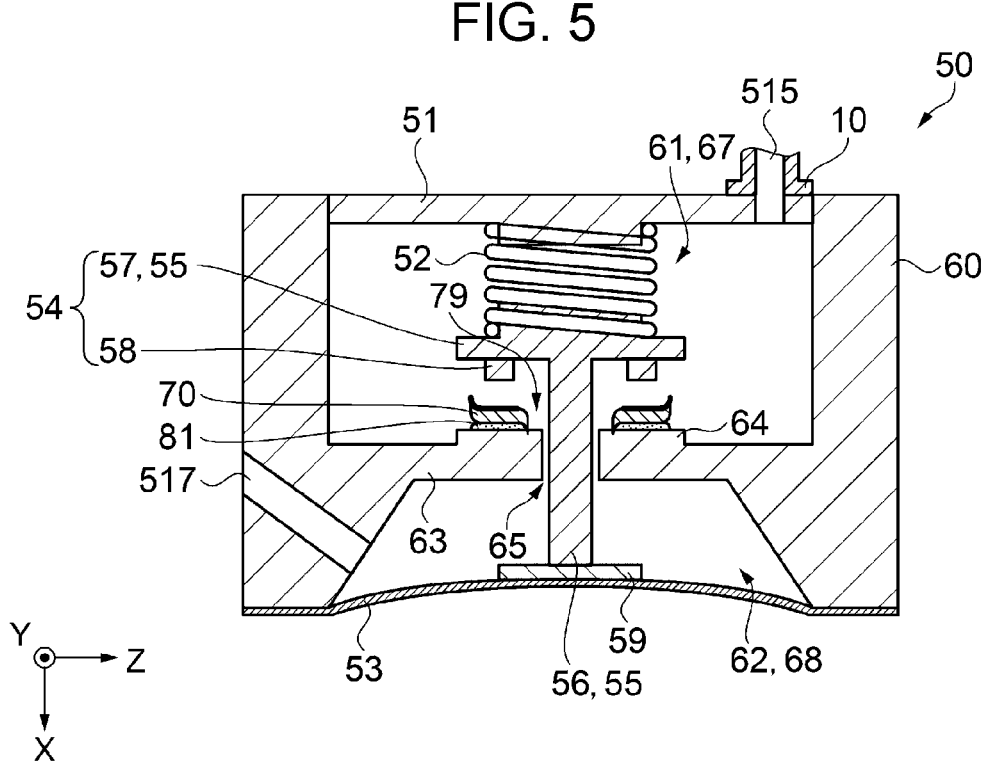

VALVE AND MANUFACTURING METHOD FOR VALVE

BACKGROUND

1. Technical Field

The present invention relates to a valve applicable to a recording apparatus that ejects an ink onto a recording medium to perform recording and a manufacturing method for the valve.

2. Related Art

For example, an ink jet recording apparatus that ejects a liquid (an ink) as droplets onto a recording medium to perform recording onto the recording medium is known. As such an ink jet recording apparatus, there is an apparatus in which an ink is supplied from a liquid storage, such as an ink tank, to a recording head via a supply pipe, such as a tube, and the ink supplied from the liquid storage is ejected as droplets from a nozzle opening of the recording head. In addition, an apparatus, in which a valve unit (a valve or a valve mechanism) that is a pressure regulating valve is provided in the middle of a flow path of an ink such that an ink supplied from liquid storage is supplied to a recording head at a predetermined pressure, is proposed (for example, JP-A-2016-022704).

The valve unit described in JP-A-2016-022704 has a valve seat that is provided in the flow path of an ink and a valve body. The valve seat has a structure in which a supporting member and an abutting member that has undergone water repelling processing are stacked. The valve body separates away from/abuts against a portion of the valve seat (the abutting member), which has undergone water repelling processing, and opens/closes the flow path of an ink.

Since the abutting member is configured as a member separate from the supporting member, sufficient water repelling processing can be carried out with respect to the abutting member without having an adverse effect on the supporting member. As a result, since an ink is unlikely to accumulate on the portion (the abutting member), from which the valve body of the valve seat separates away/against which the valve body of the valve seat abuts, a defect in which the flow path of an ink is not opened/closed normally due to the accumulated ink can be controlled over a long period of time.

However, in the valve unit described in JP-A-2016-022704, for example, a structure in which the supporting member and the abutting member are stacked is not appropriately formed due to deformation and a positional shift, a portion where the supporting member and the abutting member are stacked interferes the valve body, and thereby the valve body might not operate normally.

SUMMARY

The invention can be realized in the following aspects or application examples.

Application Example 1

According to this application example, there is provided a valve mechanism including a valve seat that has a hole which becomes a flow path of a liquid, a valve body that opens/closes the flow path due to relative movement with respect to the valve seat, an opening member that has a first surface which is fixed to one of the valve seat and the valve body, a second surface, from which the other one of the valve seat and the valve body separates away/against which the other one of the valve seat and the valve body abuts, a third surface which intersects the first surface and the second surface, and an opening which penetrates the first surface and the second surface, a fixing member that fixes the first surface to the one of the valve seat and the valve body, and an inclined portion, which makes an interval between the one of the valve seat and the valve body and the first surface long in a direction from the opening to the third surface.

The valve mechanism according to this application example includes the valve seat, the valve body that opens/closes the flow path of the liquid due to relative movement with respect to the valve seat, and the opening member that has the first surface which is fixed to one of the valve seat and the valve body (hereinafter, simply referred to as one component), the second surface, from which the other one of the valve seat and the valve body separates away/against which the other one of the valve seat and the valve body abuts (hereinafter, simply referred to as the other component), the third surface, and the opening, through which the valve body passes, and the one component and the opening member are fixed to each other by means of the fixing member. That is, the valve mechanism according to this application example has a structure in which the one component, the fixing member, and the opening member are stacked, and the flow path of a liquid is opened/closed by the relative movement of the valve body in a portion where the one component, the fixing member, and the opening member are stacked.

Furthermore, the inclined portion, which makes the interval between the one component and the opening member long in the direction from the opening to the third surface, is provided in the portion where the one component, the fixing member, and the opening member are stacked. In a case where the interval between the one component and the opening member is narrowed, a force in the direction from the opening to the third surface acts on the fixing member from the inclined portion when the fixing member is disposed in the inclined portion.

In a case where the fixing member has fluidity due to the uncuring of the fixing member or the thermoplasticity of the fixing member, the fixing member is likely to overhang a side of the third surface since the fixing member is likely to flow in direction from the opening to the third surface, and the fixing member is unlikely to overhang a side of the opening since the fixing member is unlikely to flow in a direction from the third surface to the opening, due to the force in the direction from the opening to the third surface that acts on the fixing member from the inclined portion.

For this reason, in the portion (structure) where the one component, the fixing member, and the opening member are stacked, the fixing member is unlikely to overhang the side of the opening. Accordingly, in the portion (structure) where the one component, the fixing member, and the opening member are stacked, a defect in which the fixing member blocks the opening and the function of the valve mechanism is inhibited (possibility that the valve mechanism does not operate normally) can be controlled.

Application Example 2

In the valve mechanism according to the application example, it is preferable that the second surface include the inclined surface, which makes the interval to the one of the valve seat and the valve body long in the direction from the opening to the third surface, nearer to the opening than to the third surface.

When the second surface, from which the other component separates away/against which the other component abuts, has the inclined surface, which makes the interval to the one component long, nearer to the opening than to the third surface, the liquid is guided by the inclined surface to the side of the opening and is likely to flow to the side of the opening. For example, in a case where degraded liquids or bubbles exist in the flow path of a liquid, the degraded liquid or bubbles are likely to be discharged via the opening.

Application Example 3

In the valve mechanism according to the application example, it is preferable that the second surface further include an outer peripheral surface that is disposed on a side of the third surface with respect to the inclined surface, and the liquid repellency of the outer peripheral surface be higher than the inclined surface.

The outer peripheral surface of which the liquid repellency is improved compared to that of the inclined surface repels the liquid. For example, in a case where coloring materials or resins are dispersed in the liquid, the coloring materials or the resins are unlikely to accumulate on the outer peripheral surface. In addition, the inclined surface of which the liquid repellency is low compared to that of the outer peripheral surface repels the bubbles and bubbles are unlikely to build up in the vicinity of the opening.

Application Example 4

In the valve mechanism according to the application example, it is preferable that the opening member have a burr bent in a direction from the second surface to the first surface on an edge of the opening, and a tip of the burr bite into the one of the valve seat and the valve body.

When the tip of the burr bites into the one component, the tip of the burr serves as a type of anchor bolt, and the position of the opening member with respect to the one component is unlikely to change. Accordingly, in the portion (structure) where the one component, the fixing member, and the opening member are stacked, a defect, in which the opening member interferes the valve body or the opening member and the other component do not separate away from/abut against each other due to the change in the position of the opening member and the function of the valve mechanism is inhibited (possibility that the valve mechanism does not operate normally), can be controlled.

Application Example 5

In the valve mechanism according to the application example, it is preferable that the inclined portion include a first inclined portion disposed nearer to the opening than to the third surface, and a second inclined portion disposed nearer to the third surface than to the opening.

In a case where the interval between the one component and the opening member is narrowed, the force in the direction from the opening to the third surface acts on the fixing member from both of the first inclined portion and the second inclined portion. For this reason, compared to a case where the force in the direction from the opening to the third surface acts on the fixing member from any one of the first inclined portion and the second inclined portion, the fixing member is more unlikely to flow in the direction from the third surface to the opening, and is more unlikely to overhang the side of the opening.

Application Example 6

According to this application example, there is provided a valve mechanism including a valve seat that has a recessed portion and a hole which is provided on an inside of the recessed portion and becomes a flow path of a liquid, a valve body that opens/closes the flow path due to relative movement with respect to the valve seat, an opening member that has a first surface which is fixed to the valve seat, a second surface, from which the valve body separates away/against which the valve body abuts, a third surface which intersects the first surface and the second surface, and an opening which penetrates the first surface and the second surface, and a fixing member that fixes the first surface to the valve seat.

In a case where the fixing member has fluidity due to the uncuring of the fixing member or the thermoplasticity of the fixing member and overflows between the valve seat and the opening member, the overflowed fixing member is unlikely to block the hole (the flow path of a liquid) since the recessed portion becomes a tray for the overflowed fixing member and the overflowed fixing member is unlikely to reach the hole provided on the inside of the recessed portion.

In addition, even if the valve seat has deformed, it can be made that the hole is unlikely to be affected by the deformation of the valve seat since the hole which becomes the flow path is on an inside of the recessed portion.

Application Example 7

In the valve mechanism according to the application example, it is preferable that the opening be disposed on the inside of the recessed portion and the hole be disposed on an inside of the opening, in the case of viewing in a direction of the relative movement.

In the case of viewing in the direction of relative movement of the valve body, the opening is disposed between an inner peripheral surface of the recessed portion and the hole. Therefore, an interval between the inner peripheral surface of the recessed portion and the hole can be made long compared to a case where the opening is not disposed between the inner peripheral surface of the recessed portion and the hole. Thus, the overflowed fixing member is more unlikely to reach the hole and the overflowed fixing member is more unlikely to block the hole (the flow path of a liquid).

Application Example 8

In the valve mechanism according to the application example, it is preferable that an inclined portion, which makes an interval between the valve seat and the first surface long in a direction from the opening to the third surface be further included.

In a case where the fixing member is disposed on the inclined portion and the interval between the one component and the opening member is narrowed, the force in the direction from the opening to the third surface acts on the fixing member from the inclined portion.

In a case where the fixing member has fluidity due to the uncuring of the fixing member or the thermoplasticity of the fixing member, the fixing member is likely to overhang the side of the third surface since the fixing member is likely to flow in the direction from the opening to the third surface, and the fixing member is unlikely to overhang side of the opening since the fixing member is unlikely to flow in the direction from the third surface to the opening, due to the force in the direction from the opening to the third surface that acts on the fixing member from the inclined portion.

For this reason, in the portion (structure) where the one component, the fixing member, and the opening member are stacked, the fixing member is unlikely to overhang the side of the opening and is unlikely to interfere the valve body which passes through the opening. Accordingly, in the portion (structure) where the one component, the fixing member, and the opening member are stacked, a defect, in which the fixing member interferes the valve body and the relative movement of the valve body is inhibited (possibility that the valve body does not operate normally), can be controlled.

Application Example 9

In the valve mechanism according to the application example, it is preferable that the second surface further include an inclined surface, which makes an interval to the valve seat long in a direction from the opening to the third surface, nearer to the opening than to the third surface.

When the second surface, from which the other component separates away/against which the other component abuts, has the inclined surface, which makes the interval to the one component long, nearer to the opening than to the third surface, the liquid is guided by the inclined surface to the side of the opening and is likely to flow to the side of the opening. For example, in a case where degraded liquids or bubbles exist in the flow path of a liquid, the degraded liquid or the bubbles are likely to be discharged via the opening.

Application Example 10

In the valve mechanism according to the application example, it is preferable that the second surface further include an outer peripheral surface disposed on a side of the third surface with respect to the inclined surface, and the liquid repellency of the outer peripheral surface be higher than the inclined surface.

The outer peripheral surface of which the liquid repellency is improved compared to that of the inclined surface repels the liquid. For example, in a case where coloring materials or resins are dispersed in the liquid, the coloring materials or the resins are unlikely to accumulate on the outer peripheral surface. In addition, the inclined surface of which the liquid repellency is low compared to that of the outer peripheral surface repels the bubbles and bubbles are unlikely to remain in the vicinity of the opening.

Application Example 11

In the valve mechanism according to the application example, it is preferable that the inclined portion include a first inclined portion disposed nearer to the opening than to the third surface, and a second inclined portion disposed nearer to the third surface than to the opening.

In a case where the interval between the one component and the opening member is narrowed, the force in the direction from the opening to the third surface acts on the fixing member from both of the first inclined portion and the second inclined portion. For this reason, compared to a case where the force in the direction from the opening to the third surface acts on the fixing member from any one of the first inclined portion and the second inclined portion, the fixing member is more unlikely to flow in the direction from the third surface to the opening, and is more unlikely to overhang the side of the opening.

Application Example 12

In the valve mechanism according to the application example, it is preferable that the valve seat further include a projected portion, and the opening member be disposed on an inside of the projected portion in the case of viewing in a direction of the relative movement.

When the projected portion is set as an alignment mark for detecting the position of the valve seat, the position of the valve seat can be correctly found out due to the projected portion and the opening member can be disposed at a predetermined position on the valve seat with high accuracy.

Accordingly, in the portion (structure) where the one component, the fixing member, and the opening member are stacked, a defect, in which the opening member interferes the valve body or the opening member and the other component do not separate away from/abut against each other due to a positional shift of the opening member, and the function of the valve mechanism is inhibited (possibility that the valve mechanism does not operate normally), can be controlled.

Application Example 13

In the valve mechanism according to the application example, it is preferable that flow path resistance between the valve seat and the first surface gradually decrease from the opening side to the third surface side.

When the flow path resistance between the valve seat and the first surface gradually decrease from the opening side to the third surface side, it can be made that the fixing member is likely to flow to the third surface side than to the opening side. Accordingly, in the portion (structure) where the one component, the fixing member, and the opening member are stacked, a defect in which the fixing member blocks the opening and the function of the valve mechanism is inhibited (possibility that the valve mechanism does not operate normally) can be controlled.

Application Example 14

According to this application example, there is provided a manufacturing method for a valve mechanism. The valve mechanism includes a valve seat that has a hole which becomes a flow path of a liquid, a valve body that opens/closes the flow path due to relative movement with respect to the valve seat, and an opening member that has a first surface which is fixed to one of the valve seat and the valve body, a second surface, from which the other one of the valve seat and the valve body separates away/against which the other one of the valve seat and the valve body abuts, a third surface which intersects the first surface and the second surface, and an opening, which penetrates the first surface and the second surface and through which the valve body passes. The manufacturing method includes disposing the fixing member between the one of the valve seat and the valve body and the first surface, narrowing an interval between the one of the valve seat and the valve body and the first surface and moving the fixing member such that a movement amount of the fixing member is larger on the third surface side than on the opening side, and curing the fixing member.

When the fixing member is disposed between the one component and the first surface (the opening member) and the fixing member is cured such that the movement amount of the fixing member from the position where the fixing member is disposed is made larger on the third surface side than on the opening side, the fixing member is unlikely to block the opening since the movement amount of the fixing member is smaller on the opening side than on the third surface.

Accordingly, in a case where a structure, in which the one component, the fixing member, and the opening member are stacked, is formed, a defect, in which the fixing member blocks the opening and the function of the valve mechanism is inhibited (possibility that the valve mechanism does not operate normally) can be controlled.

Application Example 15

In the manufacturing method for a valve mechanism according to the application example, it is preferable that forming the opening by punching out the opening member in a direction from the second surface to the first surface before the disposing of the fixing member be further included.

For example, when the opening is formed by punching out the opening member in the direction from the second surface to the first surface with the use of a press tool (tool), the burr bent in the direction from the second surface to the first surface can be formed on the edge of the opening. Accordingly, moving the fixing member much more on the third surface side than on the opening side is easy due to the burr.

Application Example 16

In the manufacturing method for a valve mechanism according to the application example, it is preferable that forming a liquid repellent film on the second surface before the forming of the opening be further included.

When the opening member is punched out in the direction from the second surface to the first surface with the use of the press tool (tool) in a state where the liquid repellent film is formed on the second surface, the inclined surface bent in the direction from the second surface to the first surface (the inclined surface, which makes the interval to the one component long) can be formed on the second surface. That is, the inclined surface bent in the direction from the second surface to the first surface and the outer peripheral surface disposed on the side of the third surface with respect to the inclined surface can be formed on the second surface.

Furthermore, since the press tool (tool) comes into contact with the inclined surface bent in the direction from the second surface to the first surface when punching out the opening member, the liquid repellent film covering the inclined surface is practically scraped off. Since the press tool (tool) does not come into contact with the outer peripheral surface when punching out the opening member, the liquid repellent film covering the outer peripheral surface remains. Accordingly, the liquid repellency of the outer peripheral surface can be improved compared to that of the inclined surface. In addition, the inclined surface of which the liquid repellency is low compared to that of the outer peripheral surface repels bubbles, and the bubbles are unlikely to build up in the vicinity of the opening.

Application Example 17

In the manufacturing method for a valve mechanism according to the application example, it is preferable that a burr bent in the direction from the second surface to the first surface be formed on an edge of the opening in the forming of the opening, and a tip of the burr bite into the one of the valve seat and the valve body in the moving of the fixing member.

When the burr bent in the direction from the second surface to the first surface is formed on the edge of the opening in the forming of the opening and the tip of the burr bites into the one component in the moving of the fixing member, the tip of the burr serves as a type of anchor bolt, and the position of the opening member with respect to the one component is unlikely to change. Accordingly, in the portion (structure) where the one component, the fixing member, and the opening member are stacked, a defect, in which the opening member interferes the valve body or the opening member and the valve body do not separate away from/abut against each other due to a change in the position and the function of the valve mechanism is inhibited (possibility that the valve mechanism does not operate normally), can be controlled.

Application Example 18

In the manufacturing method for a valve mechanism according to the application example, it is preferable that providing a groove, of which flow path resistance between the one of the valve seat and the valve body and the first surface gradually decreases from the opening side to the third surface side, in the one of the valve seat and the valve body or the first surface be further included.

When the flow path resistance between the one component and the first surface gradually decreases from the opening side to the third surface side, it can be made that the fixing member is likely to flow to the third surface side than to the opening side. Accordingly, in the portion (structure) where the one component, the fixing member, and the opening member are stacked, a defect in which the fixing member blocks the opening and the function of the valve mechanism is inhibited (possibility that the valve mechanism does not operate normally) can be controlled.

Application Example 19

According to this application example, there is provided a manufacturing method for a valve mechanism. The valve mechanism includes a valve seat that has a recessed portion and a hole which is provided on an inside of the recessed portion and becomes a flow path of a liquid, a valve body that opens/closes the flow path due to relative movement with respect to the valve seat, and an opening member that has a first surface which is fixed to the valve seat, a second surface, from which the valve body separates away/against which the valve body abuts, a third surface which intersects the first surface and the second surface, and an opening which penetrates the first surface and the second surface, and a fixing member that fixes the first surface to the valve seat. The manufacturing method includes disposing the fixing member between the valve seat and the first surface, and pressure-bonding the valve seat and the first surface together.

In a case where the fixing member overflows between the valve seat and the opening member due to the disposing of the fixing member between the valve seat and the first surface (the opening member) and the pressure-bonding of the valve seat and the opening member together, the overflowed fixing member is unlikely to block the hole (the flow path of a liquid) since the recessed portion becomes a tray for the overflowed fixing member and the overflowed fixing member is unlikely to reach the hole provided on the inside of the recessed portion.

In addition, even if the valve seat deforms due to pressure-bonding, the hole is unlikely to be blocked or the diameter of the hole is unlikely to become smaller due to the deformed valve seat, and it can be made that the hole is unlikely to be affected by the deformation of the valve seat since the hole which becomes the flow path is on an inside of the recessed portion.

Application Example 20

In the manufacturing method for a valve mechanism according to the application example, it is preferable that providing a groove, of which flow path resistance between the valve seat and the first surface gradually decreases from the opening side to the third surface side, in the valve seat or the first surface be further included.

When the flow path resistance between the valve seat and the first surface gradually decreases from the opening side to the third surface side, it can be made that the fixing member is likely to flow to the third surface side than to the opening side. Accordingly, in a portion (structure) where the valve seat, the fixing member, and the opening member are stacked, a defect in which the fixing member blocks the opening and the function of the valve mechanism is inhibited (possibility that the valve mechanism does not operate normally) can be controlled.

BRIEF DESCRIPTION OF THE DRAWINGS

The invention will be described with reference to the accompanying drawings, wherein like numbers reference like elements.

FIG. 4 is a schematic view of main portions of the valve unit in a case where a flow path of an ink is closed.

FIG. 5 is a schematic view of the main portions of the valve unit in a case where the flow path of an ink is opened.

DESCRIPTION OF EXEMPLARY EMBODIMENTS

Figure 1:
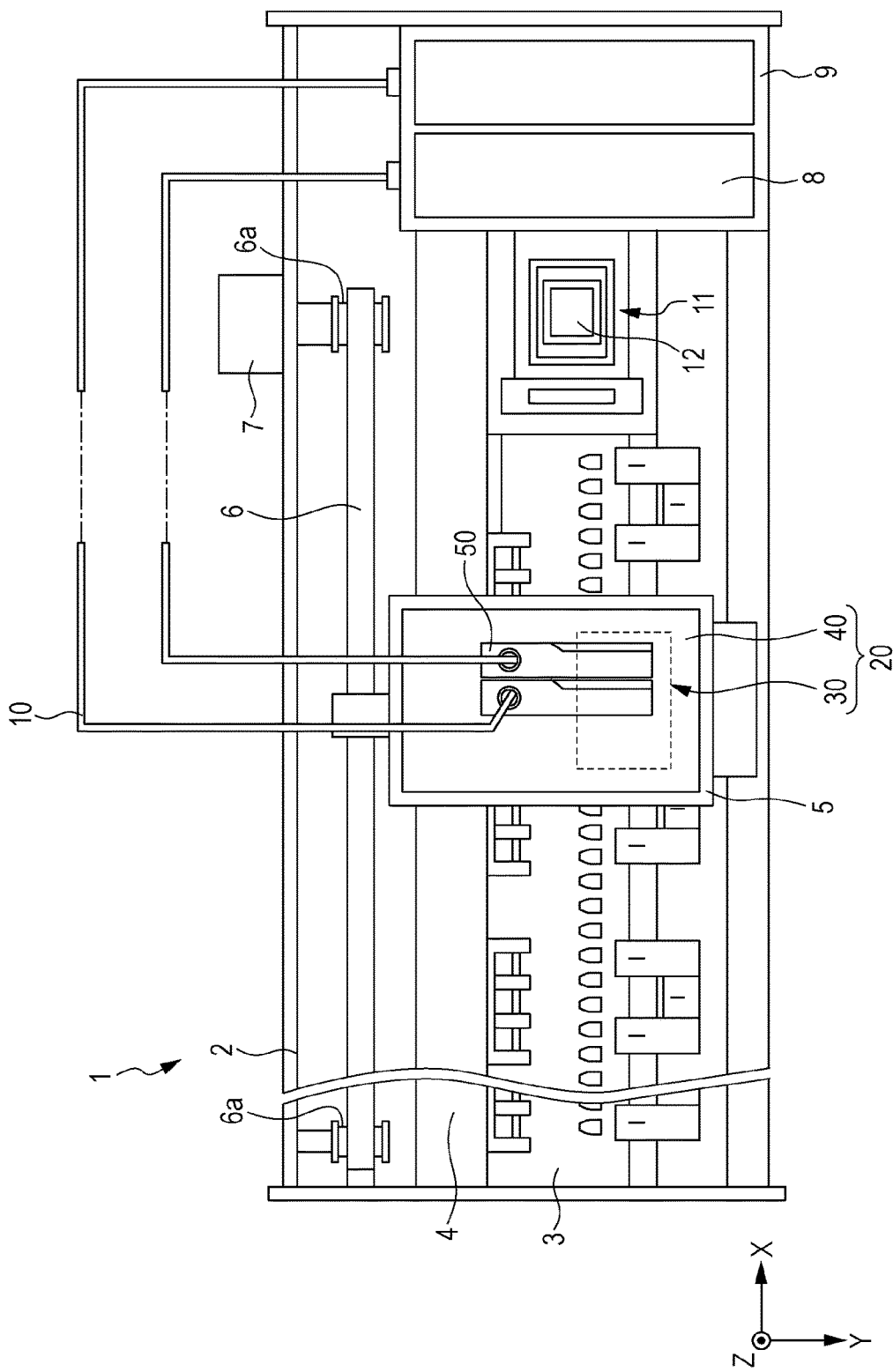
FIG. 1 is a schematic plan view of an ink jet recording apparatus.

Hereinafter, embodiments of the invention will be described with reference to the drawings. The embodiments show one form of the invention, do not limit the invention, and can be changed within the scope of technical spirit of the invention at one's discretion. In addition, in order to illustrate each layer and each part in sizes recognizable in the drawings, the scale of each layer and each part is made different from actual sizes in each of the following drawings.

Embodiment 1

Outline of Printer

FIG. 1 is a schematic plan view of an ink jet recording apparatus (hereinafter, referred to as a printer).

As illustrated in FIG. 1, a printer 1 includes a substantially rectangular main body frame 2. Inside the main body frame 2, a medium supporting member 3 that supports a recording medium (not illustrated) runs in a longitudinal direction of the main body frame 2 (a main scanning direction). On the medium supporting member 3, a recording medium, such as paper, is fed by a paper feeding mechanism (not illustrated) in a lateral direction of the main body frame 2 (a sub-scanning direction). In addition, a rod-like guide shaft 4 that extends in the main scanning direction is provided above the medium supporting member 3 inside the main body frame 2.

In the following description, the main scanning direction will be referred to as an X-direction, the sub-scanning direction will be referred to as a Y-direction, and a thickness direction of the printer 1, which is orthogonal to the X-direction and the Y-direction, will be referred to as a Z-direction. Furthermore, tip sides of arrows illustrating directions will be referred to as "positive directions" and base sides thereof will be referred to as "negative directions" in the drawings.

The X-direction is an example of a "direction of the relative movement". In the following description, viewing in the X-direction, that is, a "case of viewing in the direction of relative movement" is referred to as plan view.

A carriage 5 is supported by the guide shaft 4 so as to be in a state of being reciprocable in the X-direction along the guide shaft 4. The carriage 5 is connected to a carriage motor 7 provided in the main body frame 2 via an endless timing belt 6 hanging between a pair of pulleys 6a provided in the main body frame 2. Consequently, the carriage 5 reciprocates along the guide shaft 4 by the carriage motor 7 being driven.

An ink jet recording head (hereinafter, referred to as a recording head) 20 and a valve unit 50 according to Embodiment 1 are installed in the carriage 5.

The valve unit 50 is an example of a "valve mechanism".

As details will be described later, in the printer 1, a plurality of nozzle openings 334 are provided in a surface facing the medium supporting member 3 of the recording head 20 (refer to FIG. 2), ink droplets are ejected to a recording medium, which is fed to the medium supporting member 3, from each of the nozzle openings 334 by a pressure generator (not illustrated) provided inside the recording head 20 being driven, and thereby printing is performed on the recording medium.

A tank holder 9 is provided on a positive X-direction side of the main body frame 2, and each of a plurality of ink tanks 8, which are liquid storage, is detachably mounted in the tank holder 9. In the embodiment, two ink tanks 8 are provided. Inks, which are different from each other in types (colors), are stored in each of the ink tanks 8.

The inks are examples of a "liquid". In addition, without being limited to two, the number of ink tanks 8 may be more than two, or may be less than two.

The inks include coloring materials and solvents that disperse (or dissolve) the coloring materials. The coloring materials are, for example, dyes or pigments. The solvents are, for example, aqueous media, and pure water or ultrapure water, such as ion exchanged water, ultrafiltration water, reverse osmosis water, and distilled water, can be used. That is, the inks are aqueous inks using aqueous media as solvents.

The inks may be non-aqueous inks using organic solvents as solvents.

Each of the ink tanks 8 mounted in the tank holder 9 is connected to the valve unit 50 via supply pipes 10 such as a tube. Each color of inks stored in each of the ink tanks 8 is pressurized by a pressure pump (not illustrated), and are pressurized and supplied to the valve unit 50 via the supply pipes 10.

A maintenance unit 11 for carrying out maintenance processing, such as cleaning of the valve unit 50 and the recording head 20, is provided in a home position region of the carriage 5 disposed on the positive X-direction side inside the main body frame 2. The maintenance unit 11 includes a cap 12 for abutting against the recording head 20 so as to surround each of the nozzle openings 334 of the recording head 20 or accommodating inks ejected from each of the nozzle openings 334 by flushing, and a suction pump (not illustrated) which can suck the inside of the cap 12.

By the suction pump sucking the inside of the cap 12 in a state where the cap 12 has abutted against the recording head 20 so as to surround each of the nozzle openings 334 of the recording head 20, thickened inks and bubbles from each of the nozzle openings 334 are forcibly discharged into the cap 12.

That is, in maintenance processing, thickened inks and bubbles inside a flow path of an ink in the valve unit 50 and the recording head 20 are forcibly discharged from the nozzle openings 334, and the valve unit 50 and the recording head 20 return to a normal state.

Outline of Recording Head

Figure 2:
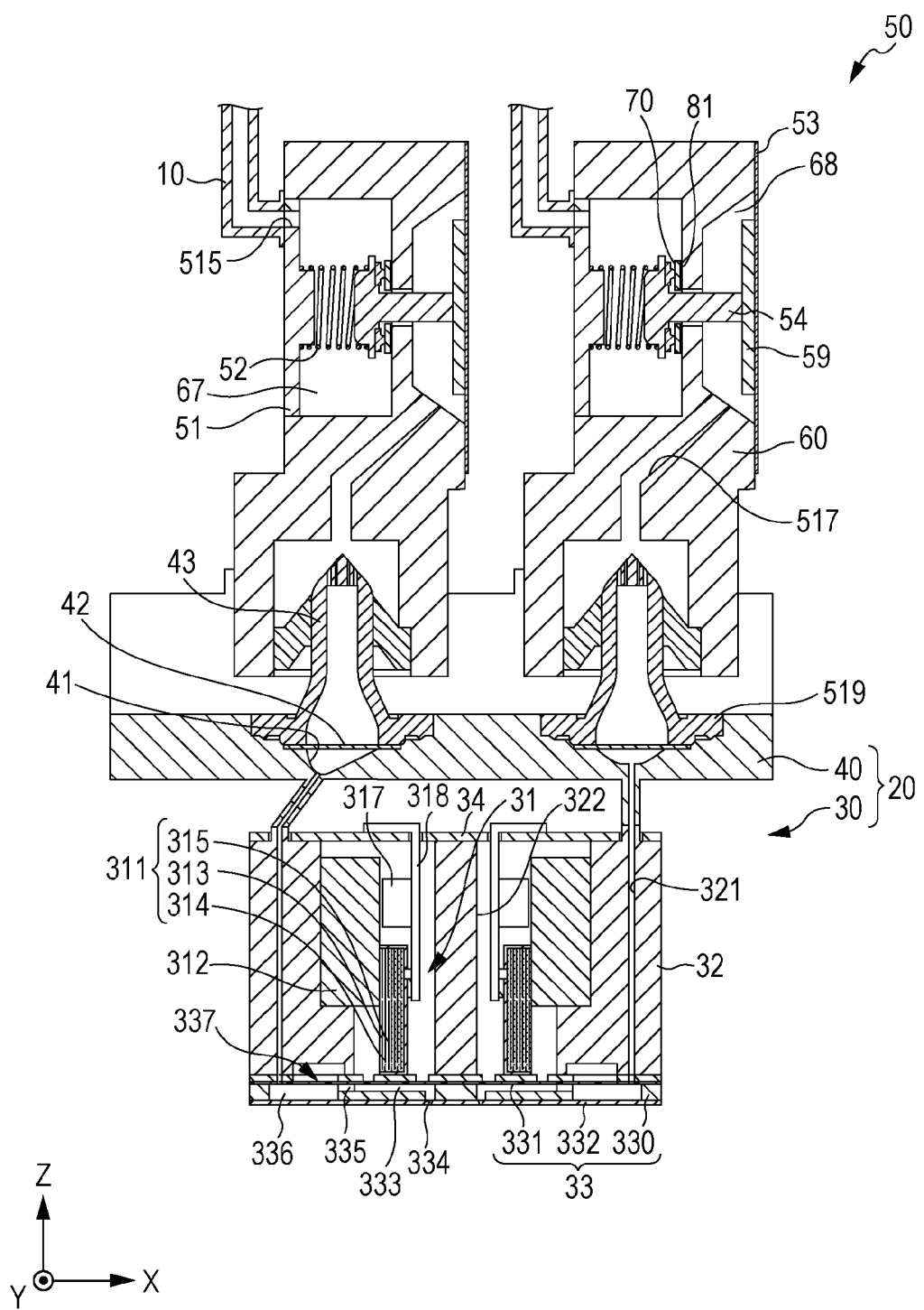
FIG. 2 is a schematic sectional view of a valve unit and a recording head according to Embodiment 1.
Figure 3:
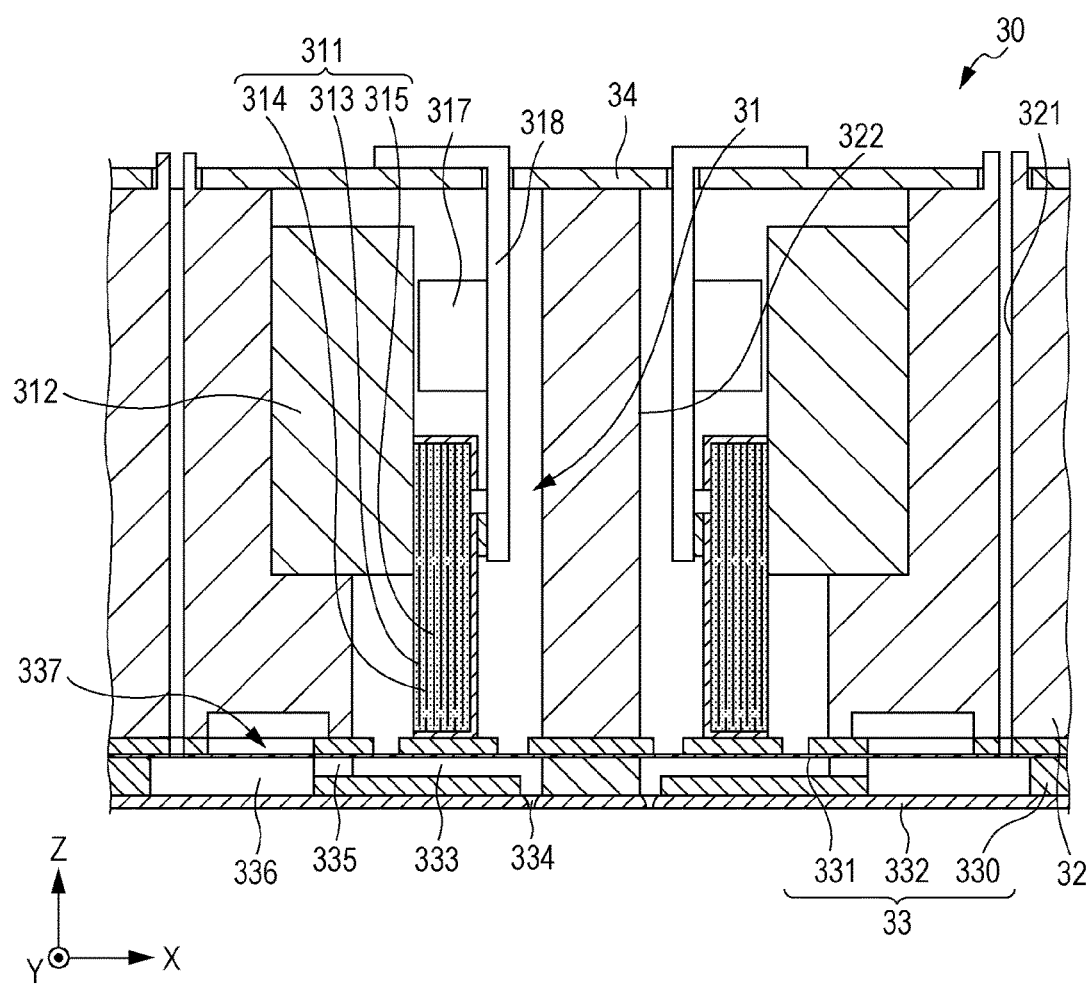
FIG. 3 is a schematic sectional view of a head main body.

FIG. 2 is a schematic sectional view of a valve unit and a recording head according to Embodiment 1. FIG. 3 is a schematic sectional view of a head main body.

Hereinafter, the outline of the recording head 20 will be described with reference to FIG. 2 and FIG. 3.

As illustrated in FIG. 2 and FIG. 3, the recording head 20 includes a head main body 30 that ejects ink droplets and a flow path member 40 that supplies inks to the head main body 30.

The head main body 30 includes actuator units 31, a case 32 which can accommodate the actuator units 31 inside thereof, a flow path unit 33 which is fixed to one surface of the case 32, and a wiring substrate 34 which is fixed to the other surface of the case 32.

The actuator units 31 have piezoelectric actuator formation members 311, in which a plurality of piezoelectric actuators are arranged in an arrangement direction of the nozzle openings 334, and fixing plates 312 which fix base portion (the other end portions) sides of the piezoelectric actuator formation members 311 as fixed ends such that tip portion (one end portion) sides of the piezoelectric actuator formation members 311 become free ends.

The piezoelectric actuator formation members 311 are formed by piezoelectric materials 313, electrode forming materials 314, and electrode forming materials 315 being alternately sandwiched and stacked. For example, a plurality of slits are formed in the piezoelectric actuator formation members 311 by a wire saw, tip portion sides thereof are cut out in a comb-tooth shape, and piezoelectric actuators are arranged.

Herein, regions of the piezoelectric actuator formation members 311 fixed to the fixing plates 312 are inactive regions that do not contribute to vibration, and only regions on the tip portion sides that are not fixed to the fixing plates 312 vibrate when a voltage is applied between the electrode forming materials 314 and the electrode forming materials 315 that configure the piezoelectric actuator formation members 311. Tip surface of the piezoelectric actuator formation members 311 are fixed to a vibration plate 331.

In addition, circuit substrates 318, such as COFs in which drive circuits 317 such as drive ICs for driving the piezoelectric actuators are installed, are connected to each piezoelectric actuator of the actuator units 31.

The flow path unit 33 includes a flow path forming substrate 330, the vibration plate 331, and a nozzle plate 332.

A plurality of pressure generating chambers 333 are arranged in the flow path forming substrate 330, and both sides of the flow path forming substrate 330 are sealed with the nozzle plate 332, which has the nozzle openings 334 corresponding to each of the pressure generating chambers 333, and the vibration plate 331. Manifolds 336 that are ink chambers, which communicate with each of the pressure generating chambers 333 via ink supply paths 335 and which are common to the plurality of pressure generating chambers 333 for each row, are formed in the flow path forming substrate 330.

Each of tips of the piezoelectric actuator formation members 311 is fixed to regions of the vibration plate 331 facing each of the pressure generating chambers 333.

In addition, compliance portions 337 are provided in regions of the vibration plate 331 corresponding to the manifolds 336. When the pressures inside the manifolds 336 have changed, the compliance portions 337 absorb the changes in the pressure by the compliance portions 337 being deformed, and keep the pressures inside the manifolds 336 constant at all times.

Ink introduction paths 321 to supply inks from the valve unit 50 to the manifolds 336 are provided in the case 32. In the embodiment, a total of two ink introduction paths 321 are provided, one for each of the manifolds 336. Inks supplied from the ink tanks 8 to the ink introduction paths 321 via the valve unit 50 are supplied to the manifolds 336, and are distributed to each of the pressure generating chambers 333 via the ink supply paths 335.

In addition, accommodation units 322 corresponding to rows of the pressure generating chambers 333 are provided in the case 32. In the embodiment, two accommodation units 322 are provided, and each of the actuator units 31 is fixed inside each of the accommodation units 322.

Furthermore, the wiring substrate 34 is provided on a side of the case 32 opposite to the flow path unit 33, and the other end portions of the circuit substrates 318, of which one end is connected to each of the actuator unit 31, are connected to the wiring substrate 34.

In such a head main body 30, the volumes of each of the pressure generating chambers 333 are changed by deforming the piezoelectric actuator formation members 311 (the piezoelectric actuators) and the vibration plate 331, and ink droplets are ejected from predetermined nozzle openings 334.

As illustrated in FIG. 2, one end of the flow path member 40 is fixed to the valve unit 50, and the other end thereof is fixed to the head main body 30. Inks from the valve unit 50 are supplied to the head main body 30 via the flow path member 40.

Specifically, ink communication paths 41 are provided in the flow path member 40. A filter 42 that removes foreign substances included in inks, such as dust and bubbles, and a supply needle 43 provided on the filter 42 are provided on one surface to which the ink communication path 41 opens. The supply needles 43 are inserted in the valve unit 50, and inks from the valve unit 50 are supplied to the head main body 30 via the ink communication paths 41 after the inks pass the inside of the supply needles 43 and foreign substances are removed by the filters 42.

Outline of Valve Unit

Figure 6:
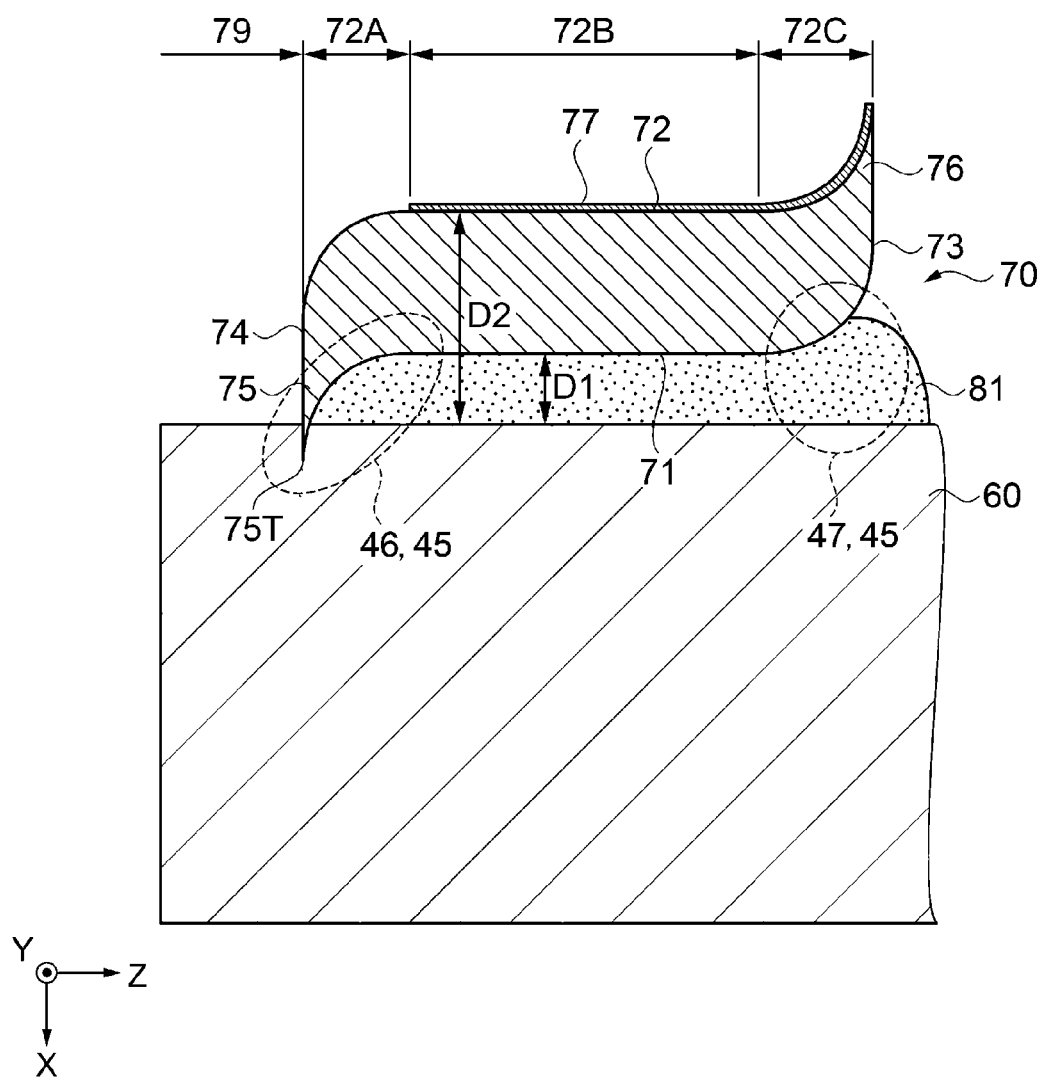
FIG. 6 is an enlarged view of a region VI enclosed with a two-dot chain line of FIG. 4.

FIG. 4 is a schematic view of main portions of the valve unit in a case where a flow path of an ink is closed. FIG. 5 is a schematic view of the main portions of the valve unit in a case where the flow path of an ink is open. FIG. 6 is an enlarged view of a region VI enclosed with a two-dot chain line of FIG. 4.

In FIG. 6, in order to make a configuration of the invention easy to understand, a valve seat 60, an opening member 70, and an adhesive 81 are illustrated, and the valve seat 60 is illustrated in a rectangle for convenience of illustration.

Next, the outline of the valve unit 50 will be described with reference to FIG. 4 to FIG. 6.

The valve unit 50 is provided in the middle of a flow path in which an ink flows, and is an open/closed valve that opens or closes the flow path of an ink.

As illustrated in FIG. 4 and FIG. 5, a lid member 51, the valve seat 60, and a film member 53 are disposed in this order in the X-direction in the valve unit 50. The lid member 51 and the film member 53 are circular members in plan view.

A valve body 54 or the valve seat 60 is an example of "one of the valve seat and the valve body" or "the other one of the valve seat and the valve body".

The lid member 51 and the valve seat 60 are members formed, for example, by forming a thermoplastic resin. The lid member 51 is bonded to the valve seat 60, for example, by heat welding. The film member 53 is configured of a resin film having flexibility, is deformable, and is bonded to the valve seat 60, for example, by heat welding.

The valve seat 60 has a first recessed portion (empty space) 61 on a side of the lid member 51, and a second recessed portion (empty space) 62 on a side of the film member 53. The first recessed portion 61 and the second recessed portion 62 are partitioned by a partition 63, and both of the first recessed portion 61 and the second recessed portion 62 are circular in plan view. An opening of the first recessed portion 61 is sealed with the lid member 51, and the first recessed portion 61 is a liquid chamber 67. An opening of the second recessed portion 62 is sealed with the film member 53, and the second recessed portion 62 is a pressure regulating chamber 68.

The partition 63 has a projected portion 64 on a side of the first recessed portion 61. The projected portion 64 is circular in plan view, and is disposed in the middle of the first recessed portion 61. In the middle of the projected portion 64, a hole 65 that penetrates the partition 63 is formed. The hole 65 is a flow path of an ink, which communicates with the liquid chamber 67 and the pressure regulating chamber 68.

That is, the valve seat 60 has the hole 65 that is a flow path of an ink.

The liquid chamber 67 communicates with the ink tank 8 via an inflow path 515 and the supply pipe 10. The pressure regulating chamber 68 communicates with the ink communication path 41 of the flow path member 40 via an outflow path 517. An ink stored in the ink tank 8 is supplied to the recording head 20 by going through the supply pipe 10, the inflow path 515, the liquid chamber 67, the hole 65, the pressure regulating chamber 68, and the outflow path 517.

A spring 52, the valve body 54, the opening member 70, and a pressure receiving plate 59 are disposed in this order between the lid member 51 and the film member 53.

One end of the spring 52 is fixed to the lid member 51, and the other end of the spring 52 is fixed to the valve body 54.

The valve body 54 is configured of a main body portion 55 and a seal portion 58.

The main body portion 55 is configured of a shaft portion 56 and a flange portion 57, which is thicker than the shaft portion 56. The shaft portion 56 is a cylindrical member which is long in the X-direction, passes through the hole 65, and is disposed so as to straddle the liquid chamber 67 and the pressure regulating chamber 68. The flange portion 57 is a circular member in plan view, and is disposed in the liquid chamber 67. The seal portion 58 is configured of an elastic member made of, for example, elastomers and rubber, and is fixed to a surface facing the opening member 70 of the flange portion 57.

Although the shaft portion 56 and the flange portion 57 are integrated with each other in the embodiment, the shaft portion 56 and the flange portion 57 may be separated from each other. In addition, the shaft portion 56 and the pressure receiving plate 59 which will be described later may be integrated with each other.

An end of the shaft portion 56 is disposed so as to be in contact with the pressure receiving plate 59. The pressure receiving plate 59 is configured of a hard material compared to the film member 53, and is fixed in the vicinity of the middle of the film member 53. The pressure receiving plate 59 appropriately exerts a force caused by displacement of the film member 53 to the valve body 54.

The opening member 70 is configured of, for example, stainless steel (SUS), is a circular member in plan view, and is disposed on the inside of the projected portion 64. It is preferable that the opening member 70 be configured of a material unlikely to be swelled by an ink. For example, a resin, a metal, glass, ceramic, or a silicon single crystal substrate can be used as a material which configures the opening member 70, in addition to SUS. The opening member 70 is fixed to the valve seat 60 by means of the adhesive 81. In the middle of the opening member 70, an opening 79 that penetrates the opening member 70 is formed. The shaft portion 56 of the valve body 54 described above also passes through the opening 79. That is, the shaft portion 56 of the valve body 54 passes through the hole 65 of the valve seat 60 and the opening 79 of the opening member 70. For this reason, the opening 79 of the opening member 70 is a flow path of an ink which communicates with the liquid chamber 67 and the pressure regulating chamber 68.

The adhesive 81 is an example of a "fixing member". In addition, details of the opening member 70 will be described later.

In the valve unit 50, the position of the valve body 54 changes, and the seal portion 58 of the valve body 54 separates away from/abuts against the opening member 70, due to displacement of the film member 53.

Specifically, a force attributable to a pressure difference between the pressure of an ink inside the liquid chamber 67 and the pressure of an ink inside the pressure regulating chamber 68 and a force that is exerted from the pressure receiving plate 59 or the spring 52 act on the valve body 54. Due to these forces, the position of the valve body 54 is controlled, the valve body 54 reciprocates in the X-direction, and the seal portion 58 of the valve body 54 separates away from/abuts against the opening member 70.

In a case where an ink in a state of not being printed on the recording medium is not consumed, the seal portion 58 of the valve body 54 abuts against the opening member 70, the opening 79 is blocked, and the flow path of an ink between the liquid chamber 67 and the pressure regulating chamber 68 is closed as illustrated in FIG. 4.

In this regard, in a case where an ink is consumed in printing onto a recording medium and maintenance processing, a pressure that acts on an ink in the pressure regulating chamber 68 declines, the film member 53 is displaced in a direction from the pressure regulating chamber 68 to the liquid chamber 67 (a negative X-direction), and the pressure receiving plate 59 fixed to the film member 53 presses the main body portion 55 of the valve body 54, when the ink in the pressure regulating chamber 68 decreases due to the consumption of the ink. Then, as illustrated in FIG. 5, the seal portion 58 of the valve body 54 separates away from the opening member 70, and the flow path of an ink between the liquid chamber 67 and the pressure regulating chamber 68 is opened.

As described above, the valve body 54 reciprocates in the X-direction, and the flow path of an ink between the liquid chamber 67 and the pressure regulating chamber 68 is opened/closed by the seal portion 58 of the valve body 54 separating away from/abutting against the opening member 70, in the valve unit 50. In other words, the valve body 54 opens/closes the flow path of an ink by means of relative movement with respect to the valve seat 60.

Since the flow path of an ink in the valve unit 50 is closed in a case where an ink in a non-printing state is not consumed, an ink pressurized and supplied from the ink tank 8 on an upstream side of the valve unit 50 is not supplied to the recording head 20 on a downstream side of the valve unit 50.

In this regard, in a case where an ink in a printing state and maintenance processing is consumed, an ink in the pressure regulating chamber 68 gradually decreases. With the decrease in the ink in the pressure regulating chamber 68, the pressure of the pressure regulating chamber decreases and becomes negative pressure. As a consequence, the film member 53 is displaced in a direction of opening the flow path of an ink, and the ink is supplied from the liquid chamber 67 to the pressure regulating chamber 68. Thus, an ink pressurized and supplied from the ink tank 8 is supplied to the recording head 20 on the downstream side of the valve unit 50. Then, when the negative pressure of the pressure regulating chamber 68 is released due to inflow of an ink to the pressure regulating chamber 68 of the valve unit 50, the flow path of an ink comes to a closed state and the supply of an ink to the recording head 20 stops.

During printing operation, the pressure regulating chamber 68 is sequentially replenished with an ink while the valve body 54 is slightly opened with the consumption of an ink. Furthermore, due to the opening/closing of the valve body 54, pressure fluctuations of an ink inside the liquid chamber 67 on the upstream side are limited so as to stay within a certain range and are not associated with pressure changes of an ink inside the pressure regulating chamber 68 on the downstream side. Accordingly, the downstream side of the flow path of an ink is not affected even when a pressure change occurs on the upstream side of the valve body 54 on the flow path of an ink. For this reason, a pressure that acts on an ink inside the pressure regulating chamber 68 of the valve unit 50 is limited to stay within a certain range, and the flow pressure of an ink supplied to the recording head 20 is regulated so as to stay within an appropriate range.

In other words, the valve unit 50 is a valve mechanism that has a pressure regulating function to control the flow pressure of an ink supplied to the recording head 20 so as to keep the flow pressure within the appropriate range.

As illustrated in FIG. 6, the opening member 70 has a first surface 71 fixed to the valve seat 60 by means of the adhesive 81, a second surface 72 that is disposed so as to face the first surface 71 and separates away from/abuts against the seal portion 58 of the valve body 54, a third surface 73 that intersects the first surface 71 and the second surface 72 and is disposed on an outer edge of the opening member 70, and a fourth surface 74 that is disposed so as to face the third surface 73. In addition, a region enclosed with the fourth surface 74 is the opening 79, and the edge of the opening 79 is disposed on the fourth surface 74.

The opening 79 penetrates the first surface 71 and the second surface 72, and the valve body 54 passes through the opening 79. Furthermore, a part of the second surface 72 (an outer peripheral surface 72B and a second inclined surface 72C that will be described later) is covered with a water repellent film 77, which is an example of a "liquid repellent film".

As described above, the opening member 70 has the first surface 71 fixed to the valve seat 60, the second surface 72 which separates away from/abuts against the valve body 54, the third surface 73 which intersects the first surface 71 and the second surface 72, and the opening 79 which penetrates the first surface 71 and the second surface 72 and through which the valve body 54 passes.

The opening member 70 has a burr 75 bent in a direction from the second surface 72 to the first surface 71 on a side of the fourth surface 74 (the edge of the opening 79). A tip 75T of the burr 75 bites into the valve seat 60. The tip 75T of the burr 75 serves as a type of anchor bolt by the tip 75T of the burr 75 biting into the valve seat 60. Compared to a case where the tip 75T of the burr 75 does not bite into the valve seat 60, the opening member 70 is firmly fixed to the valve seat 60, and the position of the opening member 70 with respect to the valve seat 60 is unlikely to change, for example, even when a force in the Z-direction acts on the opening member 70.

Furthermore, the opening member 70 has a burr 76 bent in a direction from the first surface 71 to the second surface 72 on a side of the third surface 73 (the outer edge of the opening member 70). The burrs may be rolled-up portions.

When the burrs 75 and 76 are provided in the opening member 70, the second surface 72 of the opening member 70 has curved portions (a first inclined surface 72A and the second inclined surface 72C).

That is, near the opening 79, the first inclined surface 72A, which makes an interval D2 to the valve seat 60 long in the direction from the opening 79 to the third surface 73, is formed, when the burr 75 bent in the direction from the second surface 72 to the first surface 71 is formed on the edge of the opening 79.

Near the third surface 73, the second inclined surface 72C, which makes the interval D2 to the valve seat 60 long in the direction from the opening 79 to the third surface 73, is formed, when the burr 76 bent in the direction from the first surface 71 to the second surface 72 is formed on the outer edge of the opening member 70. The outer peripheral surface 72B, of which the interval D2 to the valve seat 60 is substantially constant, is formed between the first inclined surface 72A and the second inclined surface 72C.

The first inclined surface 72A is an example of an "inclined surface". The interval D2 to the valve seat 60 is an example of "interval to the one of the valve seat and the valve body".

As described above, the second surface 72 has the first inclined surface 72A, the outer peripheral surface 72B, and the second inclined surface 72C that are disposed in order in the direction from the fourth surface 74 (the opening 79) to the third surface 73 by the burrs 75 and 76 being provided in the opening member 70.

That is, the second surface 72 includes the first inclined surface 72A, which makes the interval D2 to the valve seat 60 long in the direction from the opening 79 to the third surface 73 and which is nearer to the opening 79 than to the third surface 73, and further includes the outer peripheral surface 72B disposed on the side of the third surface 73 with respect to the first inclined surface 72A.

Since the first inclined surface 72A is included nearer to the opening 79 than to the third surface 73, an ink is guided by the first inclined surface 72A to a side of the opening 79 and is likely to flow to the side of the opening 79.

The seal portion 58 of the valve body 54 separates away from/abuts against the outer peripheral surface 72B. That is, the outer peripheral surface 72B is a surface, from which the valve body 54 separates away/against which the valve body 54 abuts.

The first inclined surface 72A is not covered with the water repellent film 77, and the outer peripheral surface 72B is covered with the water repellent film 77. The second inclined surface 72C may be covered with the water repellent film 77, or may not be covered with the water repellent film 77. As a result, the first inclined surface 72A disposed nearer to the opening 79 than the outer peripheral surface 72B has low water repellency (liquid repellency) and improved hydrophilicity, compared to the outer peripheral surface 72B. That is, the first inclined surface 72A near the flow path of an ink (the opening 79) has improved hydrophilicity. The outer peripheral surface 72B has improved water repellency (liquid repellency) compared to the first inclined surface 72A. That is, the outer peripheral surface 72B, from which the seal portion 58 of the valve body 54 separates away from/against which the seal portion 58 abuts, has improved water repellency (liquid repellency), compared to the first inclined surface 72A.

The water repellent film 77 may be a film having liquid repellency with respect to an ink. For example, a metal film, including fluorine polymer, and a metal alkoxide molecular film having liquid repellency can be used.

As described above, in the printer 1, bubbles generated in the flow path of an ink of the valve unit 50 and the recording head 20 are forcibly discharged from the nozzle openings 334 in maintenance processing, and the valve unit 50 and the recording head 20 return to a normal state.

Since the bubbles generated in the flow path of an ink are unlikely to stick to a surface with low water repellency (a surface with high hydrophilicity) compared to a surface with high water repellency, the bubbles are unlikely to remain on the first inclined surface 72A when the hydrophilicity of the first inclined surface 72A, which is near the flow path of an ink and comes the closest to the shaft portion 56 of the valve body 54, is improved. That is, if the water repellency of the first inclined surface 72A is high, bubbles are likely to be trapped between the first inclined surface 72A and the valve body 54. In this regard, by improving the hydrophilicity of the first inclined surface 72A, bubbles inside the flow path of an ink of the valve unit 50 are likely to be discharged from the opening 79 in maintenance processing. That is, when the hydrophilicity of the first inclined surface 72A near the flow path of an ink is improved, the bubbles inside the flow path of an ink is likely to be discharged from the valve unit 50 and the exhaustion of the valve unit 50 can be improved.

When the water repellency of the outer peripheral surface 72B, from which the seal portion 58 of the valve body 54 separates away/against which the seal portion 58 abuts, is improved by the water repellent film 77, the outer peripheral surface 72B repels an ink, and composition elements of an ink are unlikely to accumulate on the outer peripheral surface 72B. If the composition elements of the ink accumulate on the outer peripheral surface 72B, a defect, in which blocking the opening 79 is difficult due to the accumulated composition elements of the ink even when the seal portion 58 of the valve body 54 abut against the outer peripheral surface 72B, occurs. Since such a defect is unlikely to occur when the ink is unlikely to accumulate on the outer peripheral surface 72B, the flow path of an ink between the liquid chamber 67 and the pressure regulating chamber 68 (the opening 79) is appropriately opened/closed and the valve unit 50 operates normally as a valve mechanism in a stable manner by the seal portion 58 of the valve body 54 separating away from/abutting against the outer peripheral surface 72B.

Furthermore, the first surface 71 of the opening member 70 has curved portions, as the second surface 72 of the opening member 70 does, when the burrs 75 and 76 are provided in the opening member 70. That is, as in the second surface 72 of the opening member 70, inclined surfaces are formed near the opening 79 (the fourth surface 74) and near the third surface 73 on the first surface 71 of the opening member 70 at an interval D1 between the valve seat 60 and the first surface 71, which is made long in the direction from the opening 79 to the third surface 73.

The interval D1 is an example of an "interval between the one of the valve seat and the valve body and the first surface".

As a result, in the valve unit 50, two inclined portions 45 (a first inclined portion 46 and a second inclined portion 47) are formed at the interval D1 between the valve seat 60 and the first surface 71, which is made long in the direction from the opening 79 to the third surface 73. In addition, the first inclined portion 46 (a portion enclosed with a dashed line in FIG. 6) is disposed nearer to the opening 79 than to the third surface 73, and the second inclined portion 47 (a portion enclosed with a dashed line in FIG. 6) is disposed nearer to the third surface 73 than to the opening 79.

That is, by the burrs 75 and 76 being provided in the opening member 70, the valve unit 50 has the two inclined portions 45 (the first inclined portion 46 and the second inclined portion 47) at the interval D1 between the valve seat 60 and the first surface 71, which is made long in the direction from the opening 79 to the third surface 73. Although there is no need to match the heights of the burrs 75 and 76, it preferable that the burr 75 be taller than the burr 76 for functional reasons.

Although details will be described later, the adhesive 81 disposed between the valve seat 60 and the opening member 70 is likely to flow in the direction from the opening 79 to the third surface 73 due to the inclined portions 46 and 47, and is unlikely to flow in a direction from the third surface 73 to the opening 79. As a result, the adhesive 81 is unlikely to overflow into the inside of the opening 79. In brief, for example, a defect, in which the adhesive 81 overflows into the inside of the opening 79, the adhesive 81 blocks the opening 79 or comes into contact with (interferes) the valve body 54, and the adhesive 81 inhibits the movement of the valve body 54, is unlikely to occur.

Manufacturing Method for Valve Unit

Figure 7:
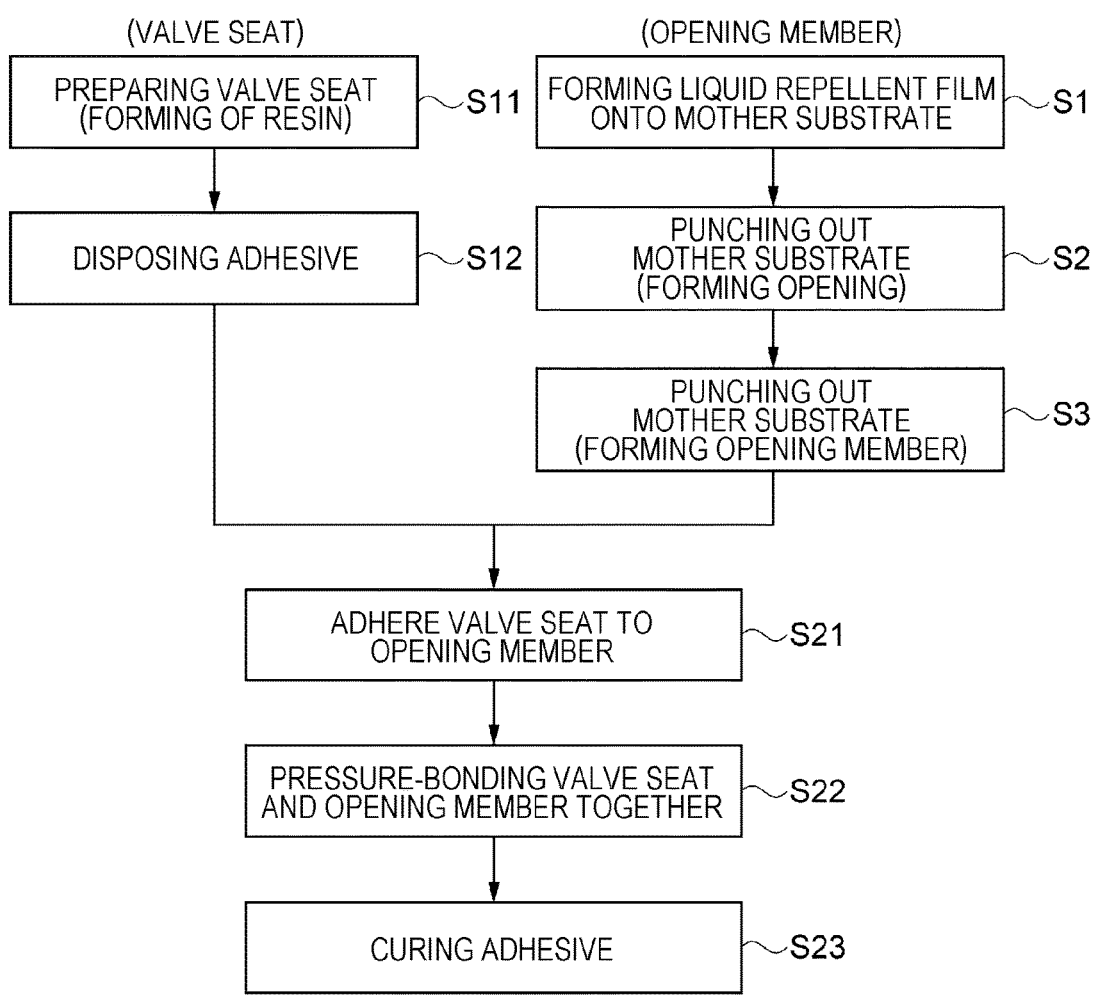
FIG. 7 is a process flow illustrating a manufacturing method for a valve unit according to Embodiment 1.

FIG. 7 is a process flow showing a manufacturing method for a valve unit according to the embodiment. FIG. 8, FIG. 9A to FIG. 9F, and FIG. 10 are schematic views illustrating a state of a process shown in FIG. 7.

Figure 8:
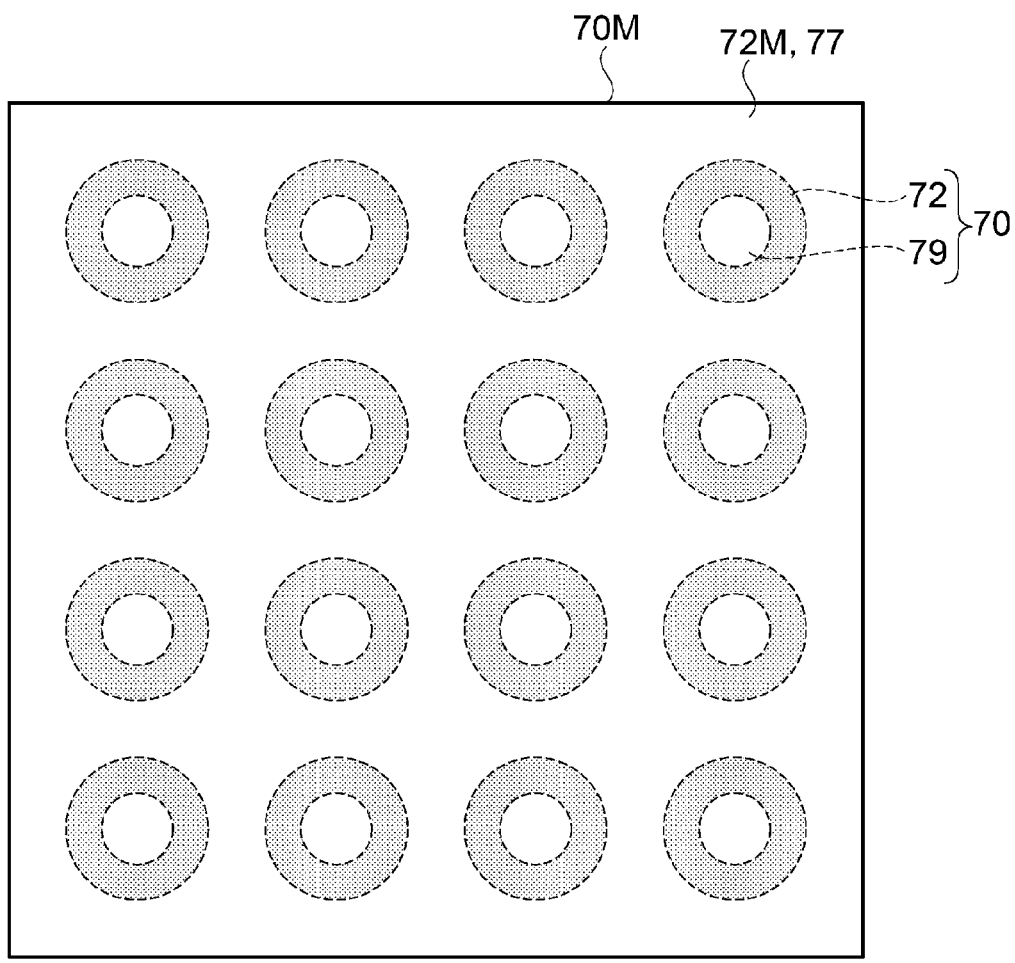
FIG. 8 is a schematic view illustrating a state of a process illustrated in FIG. 7.

FIG. 8 is a schematic view illustrating a state of a mother substrate 70M on which a plurality of opening members 70 are formed, and illustrates the opening members 70, which are formed in subsequent processes, with dashed lines. In addition, FIG. 9A to FIG. 9F are views corresponding to FIG. 4. FIG. 10 is a view corresponding to FIG. 6.

FIG. 8 is a view of the mother substrate 70M, on which the plurality of opening members 70 are formed, when seen in the X-direction. FIG. 9A to FIG. 9F and FIG. 10 are views of the opening members 70 or the valve seat 60 when seen in a direction that intersects the X-direction (the Y-direction).

Hereinafter, the outline of a manufacturing method for the valve unit 50 according to the embodiment will be described with reference to FIG. 7, FIG. 8, FIG. 9A to FIG. 9F, and FIG. 10.

As illustrated in FIG. 7, the manufacturing method for the valve unit 50 according to the embodiment includes a process of forming the water repellent film 77 onto the mother substrate 70M (Step S1), a process of punching out the mother substrate 70M to form the openings 79 (Step S2), a process of punching out the mother substrate 70M to form the opening members 70 (Step S3), a process of forming a resin to prepare the valve seat 60 (Step S11), a process of disposing the adhesive 81 (Step S12), a process of adhering the valve seat 60 and the opening members 70 together (Step S21), a process of pressure-bonding the valve seat 60 and the opening members 70 together (Step S22), and a process of curing the adhesive 81 (Step S23).

Step S1 is an example of a "forming a liquid repellent film on the second surface". Step S3 is an example of a "forming the opening". Step S12 is an example of a "disposing the fixing member". Step S22 is an example of a "moving the fixing member". Step S23 is an example of a "curing the fixing member". In addition, the order of Step S1, Step S2, and Step S3 may be reversed.

As illustrated in FIG. 8, in Step S1, the water repellent film 77 is formed on a surface 72M of the mother substrate 70M configured of SUS, that is, the surface 72M to become the second surface 72 of the opening member 70 in Step S3 which will be described later.

The water repellent film 77 can be formed, for example, by providing a metal film including a fluorine polymer on the surface 72M of the mother substrate 70M through eutectoid plating. Furthermore, the water repellent film 77 can also be formed, for example, by mixing a silane coupling agent such as a metal alkoxide solution with a solvent such as a thinner to form a metal alkoxide solution and applying the metal alkoxide solution onto the surface 72M of the mother substrate 70M.

Figure 9A:
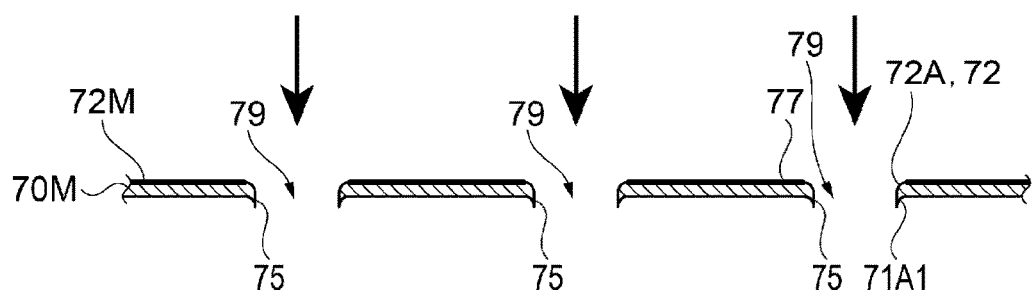
FIG. 9A is a schematic view illustrating the state of the process illustrated in FIG. 7.
Figure 10:
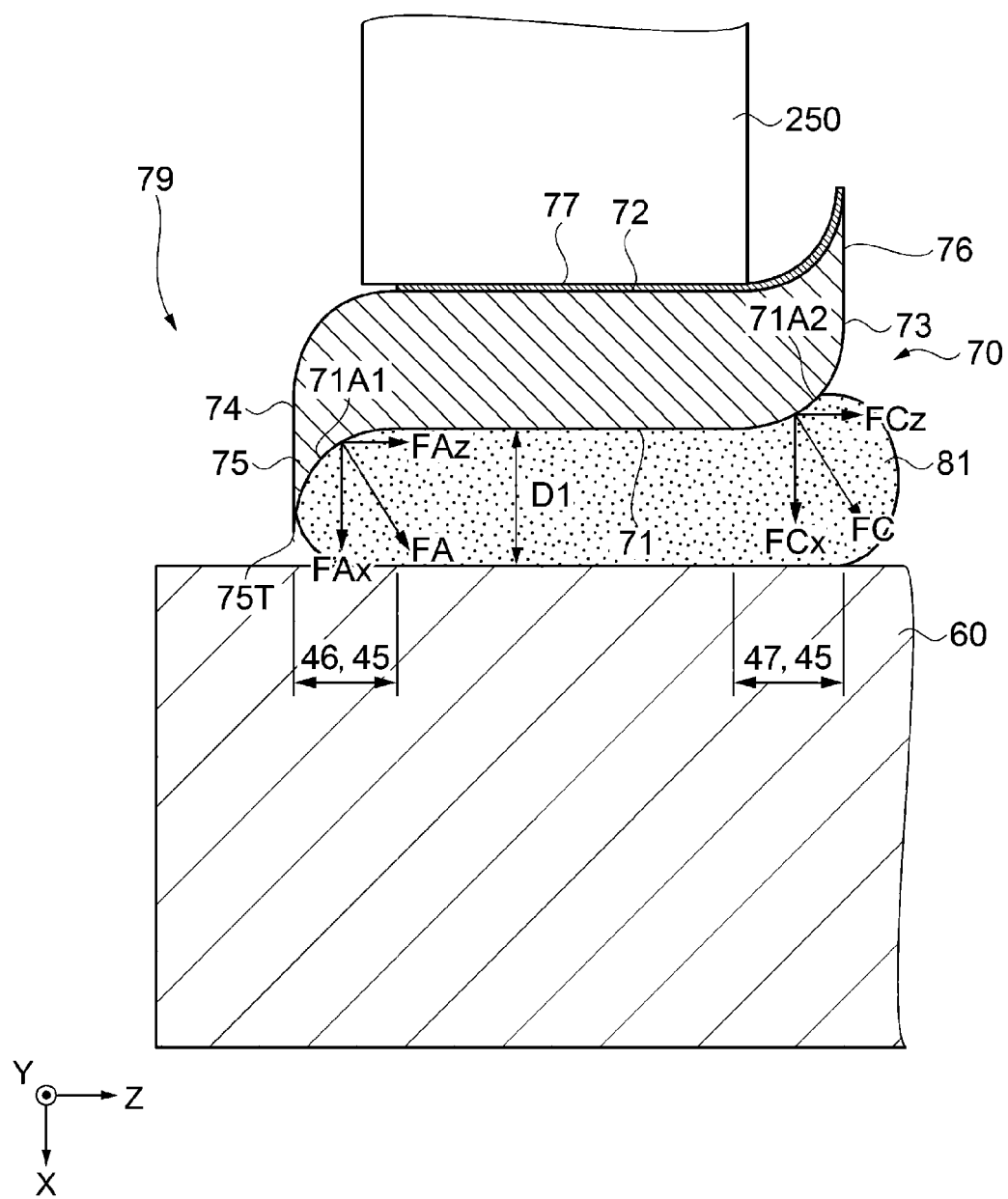
FIG. 10 is a schematic view illustrating the state of the process illustrated in FIG. 7.

As illustrated in FIG. 9A, in Step S2, the mother substrate 70M is punched out from the positive X-direction to the negative X-direction (a direction of arrows in FIG. 9A) to form the openings 79 in pressing where a press tool (not illustrated) is used. That is, the mother substrate 70M is punched out in a direction from the surface 72M on which the water repellent film 77 is formed to a surface on a side opposite to the surface 72M on which the water repellent film 77 is formed to form the openings 79, using the press tool. In Step S3 that will be described later, the surface 72M on which the water repellent film 77 is formed becomes the second surfaces 72 of the opening members 70, and the surface on the side opposite to the surface 72M on which the water repellent film 77 is formed becomes the first surfaces 71 of the opening members 70.

In Step S2, the burrs 75 bent in a direction where the mother substrate 70M is punched out, that is, the direction from the surface 72M on which the water repellent film 77 is formed (the second surface 72) to the surface on the side opposite to the surface 72M on which the water repellent film 77 is formed (the first surface 71) are formed on the edges of the openings 79. In Step S3 that will be described later, the surface 72M of the burr 75, on which the water repellent film 77 is formed, becomes the first inclined surface 72A of the second surface 72, and the surface of the burr 75 on the side opposite to the surface 72M, on which the water repellent film 77 is formed, becomes the first inclined surface 72A1 of the first surface 71. Furthermore, since the press tool comes into contact with the first inclined surface 72A of the second surface 72 in a shearing manner at the time of pressing, the water repellent film 77 provided on the first inclined surface 72A of the second surface 72 is practically scraped off.

Figure 9B:
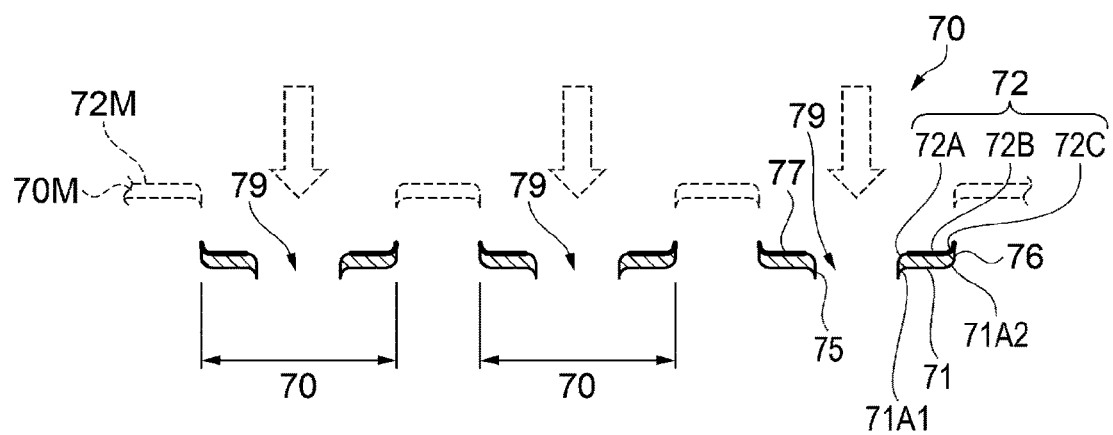
FIG. 9B is a schematic view illustrating the state of the process illustrated in FIG. 7.

As illustrated in FIG. 9B, in Step S3, the mother substrate 70M illustrated with dashed lines in FIG. 9B is punched out from the positive X-direction to the negative X-direction (a direction of arrows illustrated with the dashed lines in FIG. 9B) to form the opening members 70 in pressing where the press tool (not illustrated) is used. That is, the mother substrate 70M is punched out in the direction from the surface 72M on which the water repellent film 77 is formed to the side opposite to the surface 72M on which the water repellent film 77 is formed to form the opening members 70, using the press tool.

A burr, which is bent in the direction from the surface 72M on which the water repellent film 77 is formed to the side opposite to the surface 72M on which the water repellent film 77 is formed (the positive X-direction), is formed on the mother substrate 70M illustrated with a dashed line in FIG. 9B. Corresponding to this burr, a rolled-up portion, which is bent in the negative X-direction, is formed on the outer edge of the opening member 70. The rolled-up portion becomes the burr 76 bent in the direction from the first surface 71 to the second surface 72.

The second surface 72 of the burr 76 becomes the second inclined surface 72C, and the first surface 71 of the burr 76 becomes a second inclined surface 72A2. The outer peripheral surface 72B, which is covered with the water repellent film 77 that is not affected by pressing where the press tool is used, is formed between the first inclined surface 72A and the second inclined surface 72C on the second surface 72. That is, the outer peripheral surface 72B, which is parallel to the Y-direction and the Z-direction, is disposed between the first inclined surface 72A and the second inclined surface 72C. As a result, the first inclined surface 72A where the water repellent film 77 is practically scraped off and water repellency is lowered and the outer peripheral surface 72B, which is covered with the water repellent film 77 and of which water repellency is raised, are formed on the second surface 72. A portion where the water repellent film 77 is practically scraped off may not completely match the first inclined surface 72A.

Figure 9C:
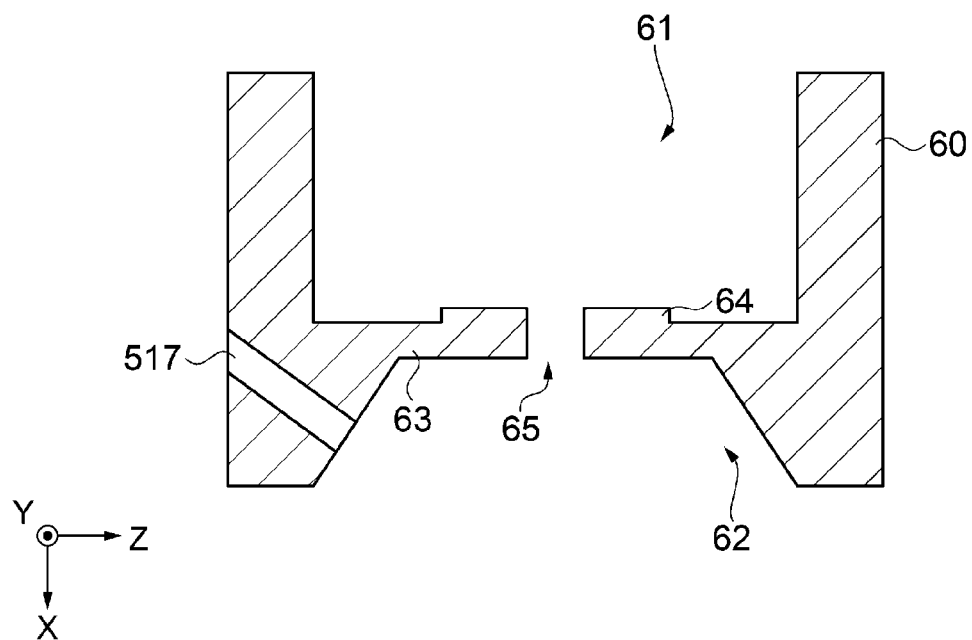
FIG. 9C is a schematic view illustrating the state of the process illustrated in FIG. 7.

As illustrated in FIG. 9C, in Step S11, a thermoplastic resin is formed using a plurality of press tools (not illustrated), and the valve seat 60 that has the first recessed portion 61, the second recessed portion 62, the projected portion 64, the hole 65, and the outflow path 517 is prepared (formed). A polyolefin resin, a polystyrene resin, a polyacrylic resin, an ABS resin, a vinyl chloride resin, a polycarbonate resin, and a polymer alloy, of which composition elements include at least one of the aforementioned resins, can be used as a thermoplastic resin.

Figure 9D:
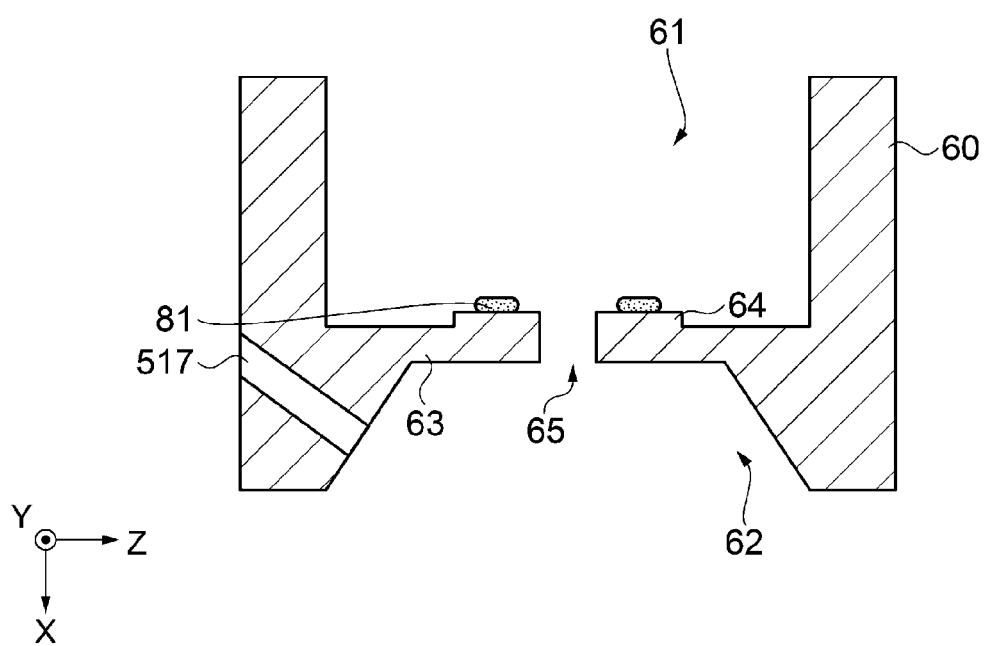
FIG. 9D is a schematic view illustrating the state of the process illustrated in FIG. 7.

As illustrated in FIG. 9D, in Step S12, the adhesive 81 is disposed on the projected portion 64 of the valve seat 60. The adhesive 81 is, for example, a thermoplastic adhesive (a solid adhesive configured of a thermoplastic resin). In Step S12, the adhesives 81 may be disposed on the projected portion 64 of the valve seat 60, for example, by applying the adhesives 81 having fluidity with the use of a dispenser.

Figure 9E:
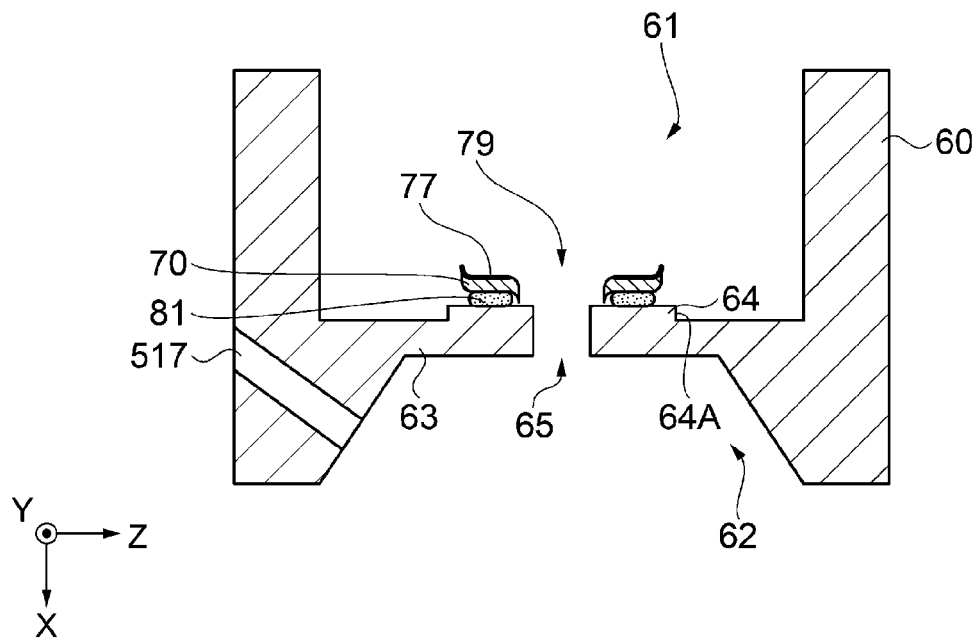
FIG. 9E is a schematic view illustrating the state of the process illustrated in FIG. 7.

As illustrated in FIG. 9E, in Step S21, the opening member 70 is disposed on the inside of the projected portion 64 of the valve seat 60 in plan view, and the valve seat 60 is adhered to the opening member 70 with the use of an adhering device (not illustrated) such that the hole 65 is disposed on the inside of the opening 79 in plan view.

In the adhering device, a step made due to a side surface 64A forming the outer peripheral surface of the projected portion 64 is detected through image recognition. That is, the projected portion 64 is an alignment mark for adhering the valve seat 60 and the opening member 70 at predetermined positions. The adhering device can adhere the opening member 70 to the valve seat 60 such that the position of the valve seat 60 is correctly recognized by means of the projected portion 64, the opening member 70 is correctly disposed on the inside of the projected portion 64 of the valve seat 60 in plan view, and the hole 65 is correctly disposed on the inside of the opening 79 in plan view.

That is, the opening member 70 can be aligned with respect to the valve seat 60 with high accuracy by providing the projected portion 64 as an alignment mark for correctly recognizing the position of the valve seat 60.

Figure 9F:
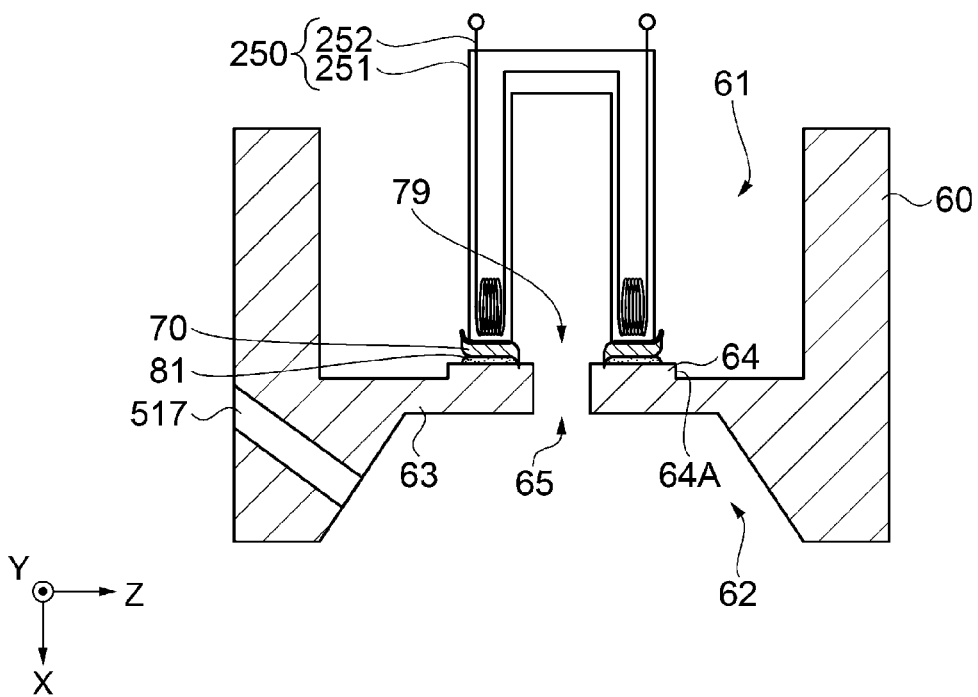
FIG. 9F is a schematic view illustrating the state of the process illustrated in FIG. 7.

As illustrated in FIG. 9F, in Step S22, the valve seat 60 and the opening member 70 are pressure-bonded together and heated with the use of the heating tool 250, and the adhesive 81 is caused to flow between the valve seat 60 and the opening member 70.

The heating tool 250 has a holder 251 and a heat generating element 252 that generates heat through electrical connection. The holder 251 supports the heat generating element 252, and is configured of a material which transmits heat easily. In Step S22, the heating tool 250 presses the opening member 70 to narrow the interval D1 between the valve seat 60 and the opening member 70, the adhesive 81 disposed between the valve seat 60 and the opening member 70 are caused to flow, and the valve seat 60 and the opening member 70 are pressure-bonded together in a state where the heat generating element 252 generates heat (a state where the heating tool 250 is heated).

That is, in Step S22, the tip 75T of the burr 75, which is formed on the edge of the opening 79 and is bent in the direction from the second surface 72 to the first surface 71 in Step S3, bites into the valve seat 60 by pressure-bonding the valve seat 60 and the opening member 70 together with the use of the heating tool 250.

By the tip 75T of the burr 75 biting into the valve seat 60, the tip 75T of the burr 75 serves as a type of anchor bolt, and the position of the opening member 70 with respect to the valve seat 60 can be made difficult to be changed compared to a case where the tip 75T of the burr 75 does not bite into the valve seat 60.

FIG. 10 schematically illustrates a fluid state of the adhesive 81 when the heating tool 250 presses the opening member 70 in Step S22.

As illustrated in FIG. 10, on the first surface 71, a first inclined surface 71A1, which is bent due to the burr 75 in the direction from the second surface 72 to the first surface 71, is formed and a second inclined surface 71A2, which is bent due to the burr 76 in the direction from the first surface 71 to the second surface 72, is formed.

By the heating tool 250, the adhesive 81 is heated and has fluidity.

The heating tool 250 presses the opening member 70 and the interval D1 between the valve seat 60 and the first surface 71 narrows, pressing the adhesive 81 disposed between the valve seat 60 and the first surface 71. At this time, a force FA in a direction orthogonal to the first inclined surface 71A1 acts from the first inclined surface 71A1 onto the adhesive 81, and a force FC in a direction orthogonal to the second inclined surface 71A2 acts from the second inclined surface 71A2 onto the adhesive 81. That is, the forces FA and FC in the directions orthogonal to the inclined surfaces 71A1 and 71A2 act on the adhesive 81 from the inclined surfaces 71A1 and 71A2. The forces FA and FC that act on the adhesive 81 are broken down into components of forces FAx and FCx in the direction from the second surface 72 to the first surface 71 (the X-direction), and into components of forces FAz and FCz in the direction from the opening 79 (the fourth surface 74) to the third surface 73 (the Z-direction).

When the components of forces FAx and FCx act on the adhesive 81, the adhesive 81 flows in a direction of becoming thinner. When the components of forces FAz and FCz act on the adhesive 81, the adhesive 81 flows in the direction from the opening 79 to the third surface 73.

Since the component of force FAz causes the adhesive 81 to flow in the direction from the opening 79 to the third surface 73 on the first inclined surface 71A1, the adhesive 81 is unlikely to overflow into the side of the opening 79. Since the component of force FCz causes the adhesive 81 to flow in the direction from the opening 79 to the third surface 73 on the second inclined surface 71A2, the adhesive 81 overflows the second inclined surface 71A2.

That is, the components of forces FAz and FCz restrict the flowing direction of the adhesive 81 such that the adhesive 81 does not flow to the side of the opening 79. As a result, the adhesive 81 is moved such that the movement amount of the adhesive 81 caused by pressure-bonding (the movement amount from a position where the adhesive 81 is disposed in Step S12 to the position of the adhesive 81 when pressure-bonding is completed by going through Step S22) is larger on a third surface 73 side than on an opening 79 side.

As described above, Step S22 is a process of narrowing the interval D1 between the valve seat 60 and the first surface 71 (the opening member 70) and moving the adhesive 81 such that the movement amount of the adhesive 81 is larger on the third surface 73 side than on the opening 79 side.

In Step S23, the adhesive 81 pressure-bonding the valve seat 60 and the opening member 70 together is heated with the use of the heating tool 250, and the adhesive 81 is cured. In a case where the adhesive 81 is a thermoplastic adhesive, heating by a heating tool is stopped and cooled in this step.

In other words, in the manufacturing method according to the embodiment, the first inclined surface 71A1 and the second inclined surface 71A2 of the burrs 75 and 76 are used as the inclined portions 46 and 47, which makes the interval D1 between the first surface 71 and the valve seat 60 long in the direction from the opening 79 to the third surface 73. Due to the inclined surfaces 71A1 and 71A2, the flowing direction of the adhesive 81 is restricted such that the components of forces FAz and FCz in the direction from the opening 79 to the third surface 73 act on the adhesive 81 and the adhesive 81 flows in the direction from the opening 79 to the third surface 73. Consequently, a defect in which the adhesive 81 overflows into the inside of the opening 79 and the adhesive 81 blocks the opening 79, or a defect in which the adhesive 81 comes into contact with (interferes) the valve body 54 and inhibits the movement of the valve body 54 can be controlled.

Accordingly, since the valve body 54 operates normally, the flow path of an ink between the liquid chamber 67 and the pressure regulating chamber 68 is appropriately opened/closed and the valve unit 50 manufactured through the manufacturing method according to the embodiment operates normally in a stable manner.

Although the first inclined surface 71A1 and the second inclined surface 71A2 of the burrs 75 and 76 at the time of pressing of the opening member 70 are used as the inclined portions 46 and 47 in the embodiment, the inclined portions are not limited thereto. Regardless of a manufacturing method for the opening member 70, at least one of the inclined portions 46 and 47, which make the interval between the valve seat 60 and the first surface 71 long, may be provided in the opening member 70. In addition, although the first inclined surface 72A is formed due to the burr 75 at the time of pressing of the opening member 70 in the embodiment, it is not limited thereto. Details will be described later.

Embodiment 2

Figure 11:
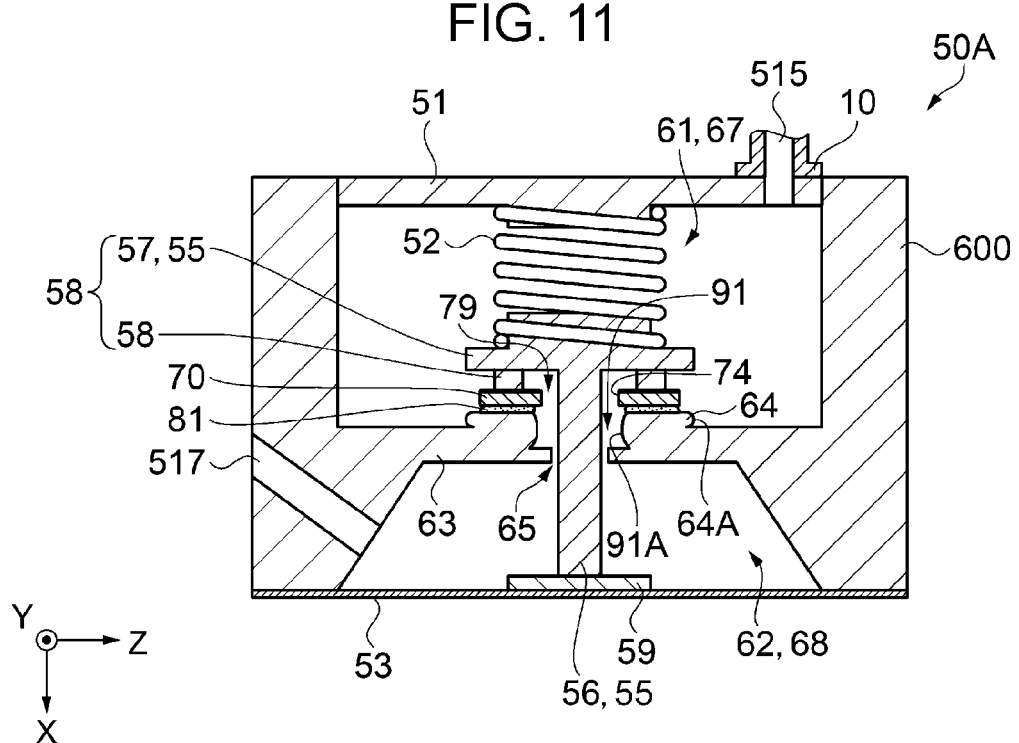
FIG. 11 is a schematic view illustrating the outline of a valve unit according to Embodiment 2.
Figure 12:
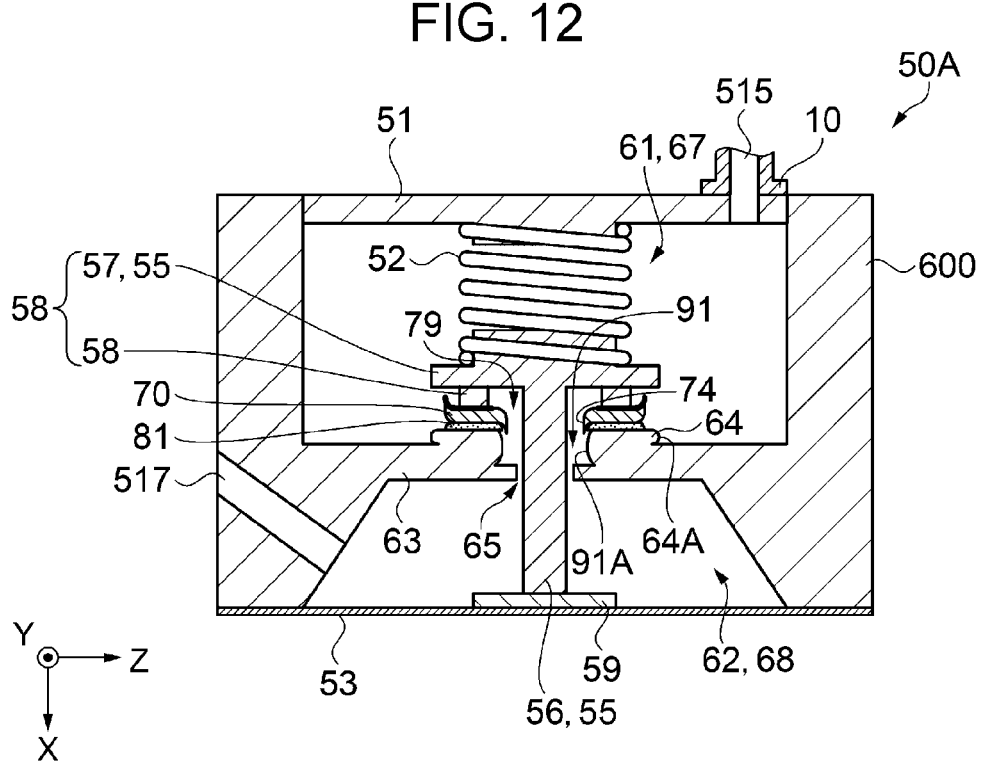
FIG. 12 is a schematic view illustrating the outline of another valve unit according to Embodiment 2.

FIG. 11 is a view corresponding to FIG. 4, and is a schematic view illustrating the outline of a valve unit according to Embodiment 2. FIG. 12 is a view corresponding to FIG. 11, and is a schematic view illustrating the outline of another valve unit according to Embodiment 2.

A main difference of a valve unit 50A according to the embodiment from the valve unit 50 according to Embodiment 1 is that a recessed portion 91 is formed in a valve seat 600 and the inclined portion 45, the first inclined surface 72A, and the second inclined surface 72C are not formed in the valve seat 600.

Hereinafter, the valve unit 50A according to the embodiment will be described with reference to FIG. 11, focusing on differences from Embodiment 1. In addition, configuration parts which are the same as those of Embodiment 1 will be assigned with the same reference signs, and overlapping description will be omitted. The valve unit 50A is also an example of a "valve mechanism".

As illustrated in FIG. 11, in the valve seat 600, the recessed portions 91 are formed on inside of the projected portion 64 and the hole 65 is formed on the inside of the recessed portion 91 in plan view. In plan view, the opening member 70 is disposed on the inside of the projected portion 64. In plan view, the opening 79 of the opening member 70 is disposed on the inside of the recessed portion 91 of the valve seat 600 and the hole 65 of the valve seat 600 is disposed on the inside of the opening 79 of the opening member 70.

A state where the opening 79 of the opening member 70 is disposed on the inside of the recessed portion 91 of the valve seat 600 in plan view is a state where the fourth surface 74 of the opening member 70 (the edge of the opening 79) protrudes from an inner peripheral surface 91A of the recessed portion 91 to an outside.

The adhesive 81 is disposed between the valve seat 600 and the opening member 70, the recessed portion 91 is disposed nearer to the adhesive 81 than to the hole 65, and the hole 65 is disposed so as to be more separated away from the adhesive 81 than the recessed portion 91. That is, the hole 65 is disposed so as to be kept away from the adhesive 81 by providing the recessed portion 91, compared to a configuration where the recessed portion 91 is not provided (a configuration of Embodiment 1). In other words, the hole 65 is disposed so as to be kept away from a surface of the valve seat 600 that is in contact with the adhesive 81.

The recessed portion 91 and the hole 65 are circular in plan view, and the diameter of the recessed portion 91 is larger than the diameter of the hole 65 in plan view. The inner peripheral surface 91A of the recessed portion 91 curves (overhangs) in a direction of approaching the valve body 54, and the side surface 64A of the projected portion 64 curves (overhangs) in a direction of keeping away from the valve body 54.

As described above, the valve unit 50A according to the embodiment includes the recessed portion 91, the valve seat 600 that has the hole 65 which is the flow path of an ink provided on the inside of the recessed portion 91, the valve body 54 that opens/closes the flow path of an ink due to relative movement with respect to the valve seat 600, the opening member 70 that is fixed to the valve seat 600 and has the opening 79, and the adhesive 81 that fixes the opening member 70 to the valve seat 600.

In the valve unit 50A according to the embodiment, as in the valve unit 50 of Embodiment 1, the outer peripheral surface 72B, from which the seal portion 58 of the valve body 54 separates away/against which the seal portion 58 abuts, is covered with the water repellent film 77 (refer to FIG. 6).

Since the hole 65 is disposed so as to be kept away from the surface of the valve seat 600 that is in contact with the adhesive 81, the recessed portion 91 becomes a tray for the flowing adhesive 81 and the flowing adhesive 81 is unlikely to reach the hole 65 in a case where the adhesive 81 flows from the surface of the valve seat 600 that is in contact with the adhesive 81 to the recessed portion 91. Accordingly, the flowing adhesive 81 is unlikely to come into contact with the valve body 54 which has passed through the hole 65, and a defect, in which the movement of the valve body 54 is inhibited, is controlled.

By improving the water repellency of the outer peripheral surface 72B, from which the seal portion 58 of the opening member 70 separates away/against which the seal portion 58 abuts, and making composition elements of an ink unlikely to accumulate on the outer peripheral surface 72B, the flow path of an ink between the liquid chamber 67 and the pressure regulating chamber 68 (the opening 79) is appropriately opened/closed and an effect in which the valve unit 50A, that is a valve mechanism, operates normally in a stable manner can be achieved.

As illustrated in FIG. 12, the inclined portions 45 (the first inclined portion 46 and the second inclined portion 47) may be formed in the valve unit 50A according to the embodiment, as in the valve unit 50 of Embodiment 1. Consequently, an effect, in which the adhesive 81 is unlikely to overflow into the inside of the opening 79 can be achieved since the adhesive 81 disposed between the valve seat 600 and the opening member 70 is likely to flow in the direction from the opening 79 to the third surface 73 and is unlikely to flow in the direction from the third surface 73 to the opening 79.

In addition, as illustrated in FIG. 12, the first inclined surface 72A may be provided in the valve unit 50A according to the embodiment regardless of the presence or absence of the inclined portions 45, as in the valve unit 50 of Embodiment 1. By the first inclined surface 72A being included near to the opening 79 than to the third surface 73, an ink is guided by the first inclined surface 72A to the side of the opening 79, and is likely to flow to the side of the opening 79.

In addition, as illustrated in FIG. 12, the first inclined surface 72A may be covered with the water repellent film 77 in the valve unit 50A according to the embodiment regardless of the presence or absence of the inclined portions 45, as in the valve unit 50 of Embodiment 1. By improving the hydrophilicity of the first inclined surface 72A near the flow path of an ink than that of the outer peripheral surface 72B, an effect, in which bubbles are likely to be discharged from the valve unit 50A and the exhaustion of the valve unit 50A (bubble discharging performance) is improved, can be achieved.

Instead of a state where the opening 79 of the opening member 70 is disposed on the inside of the recessed portion 91 of the valve seat 600 in plan view, a state where the recessed portion 91 of the valve seat 600 is disposed on the inside of the opening 79 of the opening member 70 in plan view may be adopted.

Manufacturing Method for Valve Unit

Figure 13:
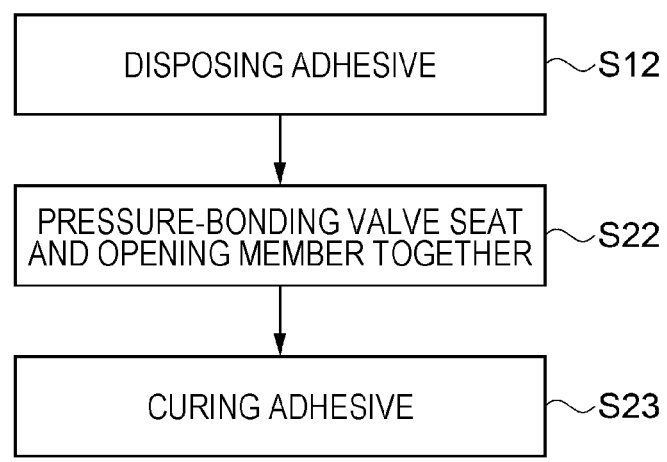
FIG. 13 is a process flow illustrating a manufacturing method for a valve unit according to Embodiment 2.
Figure 14A:
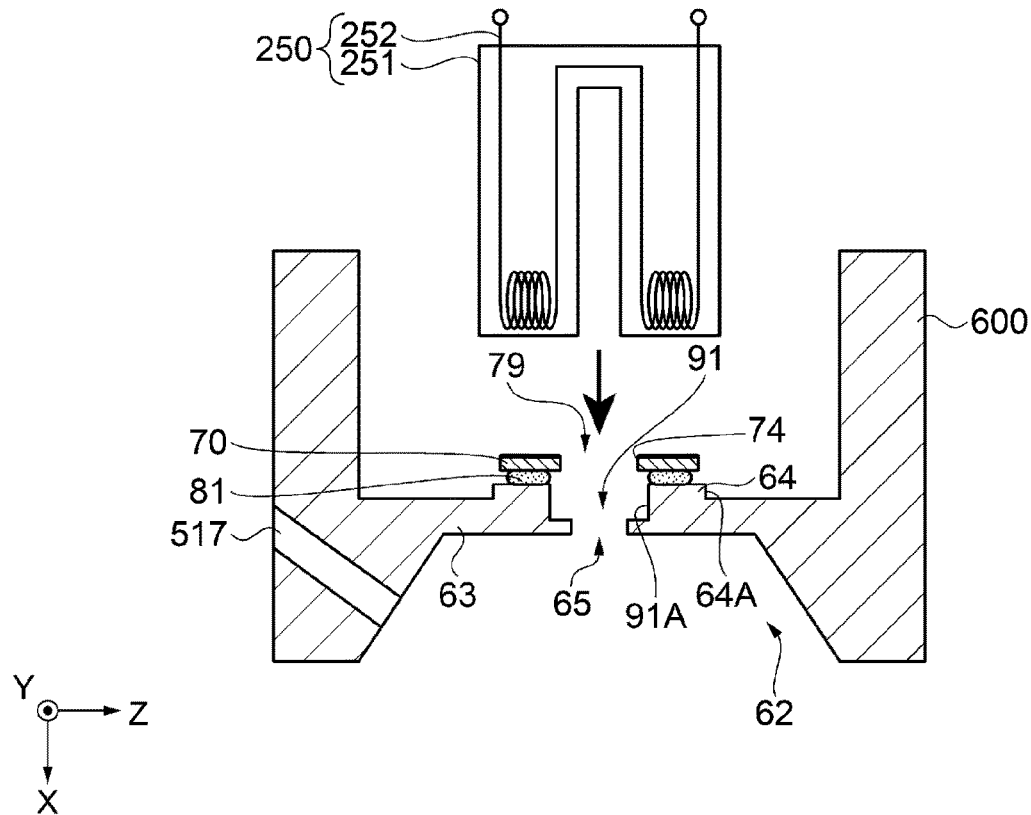
FIG. 14A is a schematic view illustrating a state of a process illustrated in FIG. 12.
Figure 14B:
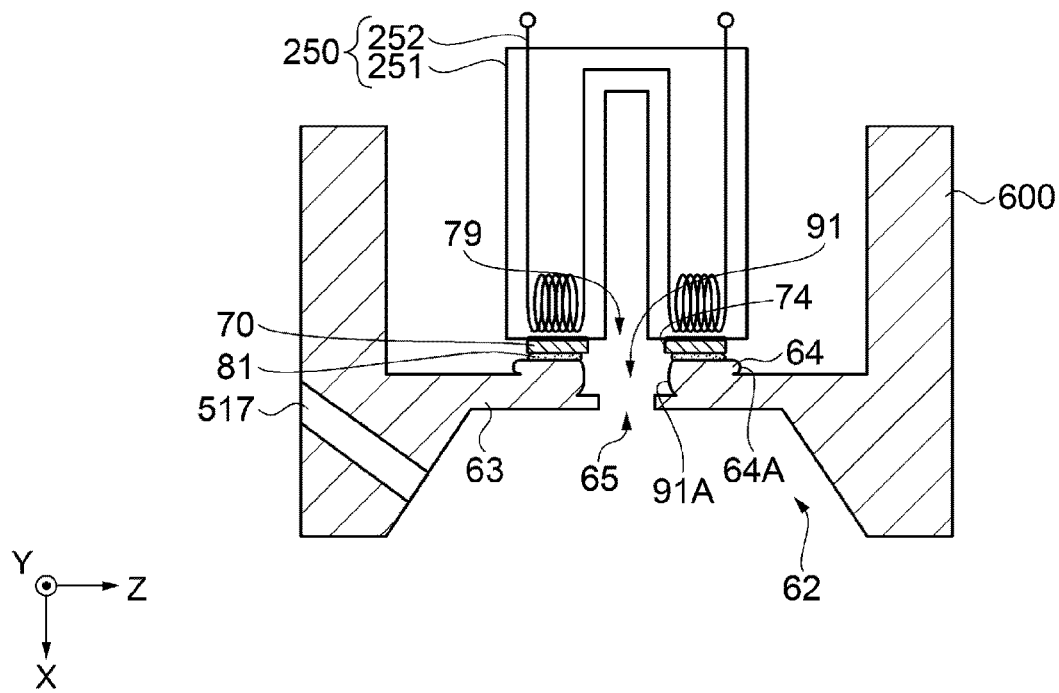
FIG. 14B is a schematic view illustrating the state of the process illustrated in FIG. 12.

FIG. 13 is a process flow showing the manufacturing method for the valve unit according to the embodiment. FIG. 14A and FIG. 14B are views corresponding to FIG. 9F, and are schematic views illustrating states of processes illustrated in FIG. 13.

Hereinafter, the outline of a manufacturing method for the valve unit 50A according to the embodiment will be described with reference to FIG. 13, FIG. 14A, and FIG. 14B.

As illustrated in FIG. 13, the manufacturing method for the valve unit 50A according to the embodiment includes the process of disposing the adhesive 81 (Step S12), the process of pressure-bonding the valve seat 600 and the opening member 70 together (Step S22), and the process of curing the adhesive 81 (Step S23).

Step S12 is an example of a "disposing the fixing member between a valve seat and a first surface". Step S22 and Step S23 are examples of a "pressure-bonding the valve seat and the first surface together".

In Step S12, the adhesive 81 is disposed on the projected portion 64 of the valve seat 600 (not illustrated).

In Step S22, as illustrated in FIG. 14A, the heating tool 250 is caused to approach the projected portion 64 of the valve seat 600 and the opening member 70 while the position of the heating tool 250 being regulated. Next, the opening member 70 is pressed by the heated heating tool 250, and the valve seat 600 and the opening member 70 are pressure-bonded together.

In Step S23, as illustrated in FIG. 14B, a state where the heated heating tool 250 presses the opening member 70 is maintained, the heat of the heating tool 250 is transmitted to the adhesive 81, and the adhesive 81 disposed between the valve seat 600 and the opening member 70 is cured. In addition, in a case where the adhesive 81 is a thermoplastic adhesive, the heating of the heating tool stops in Step S23 and the adhesive is cured by entering cooling operation while being pressed.

However, the heat of the heating tool 250 is also transmitted to the valve seat 600. For example, the valve seat 600 is configured of a thermoplastic resin which is likely to be thermally deformed, such as a polyethylene resin and a polypropylene resin. In a case where time for which the opening member 70 is pressed is long (a case where time for which the heat of the heating tool 250 is transmitted is long), the valve seat 600 is affected by the heat transmitted from the heating tool 250, and the valve seat 600 on a side near the heating tool 250 thermally deforms.

The heat of the heating tool 250 is transmitted from the surface of the valve seat 600 that is in contact with the adhesive 81 to the inside of the valve seat 600. For this reason, as the surface of the valve seat 600 that is in contact with the adhesive 81 is brought closer, the valve seat 600 becomes more likely to be affected by the heat of the heating tool 250, and as the surface of the valve seat 600 that is in contact with the adhesive 81 is brought further away, the valve seat 600 becomes more unlikely to be affected by the heat of the heating tool 250.

In a case where the hole 65 is provided in a surface of the valve seat 600 that is in contact with the adhesive 81 and the valve seat 600 is configured of a resin which is likely to be thermally deformed, the surface of the valve seat 600 that is in contact with the adhesive 81 thermally deforms depending on conditions such as the temperature of heat transmitted from the heating tool 250, the diameter of the hole 65 provided in the surface of the valve seat 600 that is in contact with the adhesive 81 becomes smaller, and a defect caused by the diameter of the hole 65 becoming smaller might occur.

For example, when the diameter of the hole 65 provided in the surface of the valve seat 600 that is in contact with the adhesive 81 becomes smaller, a defect in which an ink is unlikely to flow in the hole 65 occurs. When the diameter of the hole 65 provided in the surface of the valve seat 600 that is in contact with the adhesive 81 becomes excessively smaller, a defect in which the adhesive 81 block the hole 65 or a defect in which the valve seat 600 comes into contact with the valve body 54 and the movement of the valve body 54 is inhibited might occur.

Since the hole 65 is disposed so as to be kept away from the surface of the valve seat 600 that is in contact with the adhesive 81 due to the recessed portion 91 in the embodiment, the valve seat is unlikely to be affected by the heat transmitted from the heating tool 250 and thereby a defect, which is caused by the valve seat thermally deforming due to the heat transmitted from the heating tool 250 and by the hole being blocked or the diameter of the hole 65 becoming smaller, is less likely to occur.

In brief, the projected portion 64 and the recessed portion 91 are provided on the surface of the valve seat 600 that is in contact with the adhesive 81, and the projected portion 64 and the recessed portion 91 thermally deform due to the heat transmitted from the heating tool 250. Specifically, in the projected portion 64, the side surface 64A curves (overhangs) in the direction of keeping away from the valve body 54 due to the heat transmitted from the heating tool 250. On the other hand, in the recessed portion 91, the inner peripheral surface 91A curves (overhangs) in the direction of approaching the valve body 54 due to the heat transmitted from the heating tool 250.

That is, since the side surface 64A of the projected portion 64 curves in the direction of keeping away from the valve body 54, a defect in which the side surface 64A of the projected portion 64 comes into contact with the valve body 54 is unlikely to occur.

Since the inner peripheral surface 91A of the recessed portion 91 is disposed so as to be separated away from the valve body 54 compared to the hole 65, a defect in which the inner peripheral surface 91A of the recessed portion 91 comes into contact with the valve body 54 and the movement of the valve body 54 is inhibited is controlled even when the inner peripheral surface 91A of the recessed portion 91 curves in the direction of approaching the valve body 54.

In the manufacturing method according to the embodiment described above, since an adverse effect of the heat transmitted from the heating tool 250 is controlled by providing the recessed portion 91 in the valve seat 600, the valve body 54 operates normally, the flow path of an ink between the liquid chamber 67 and the pressure regulating chamber 68 (the opening 79) is appropriately opened/closed, and the valve unit 50A manufactured through the manufacturing method according to the embodiment operates normally in a stable manner.

Embodiment 3

Figure 15:
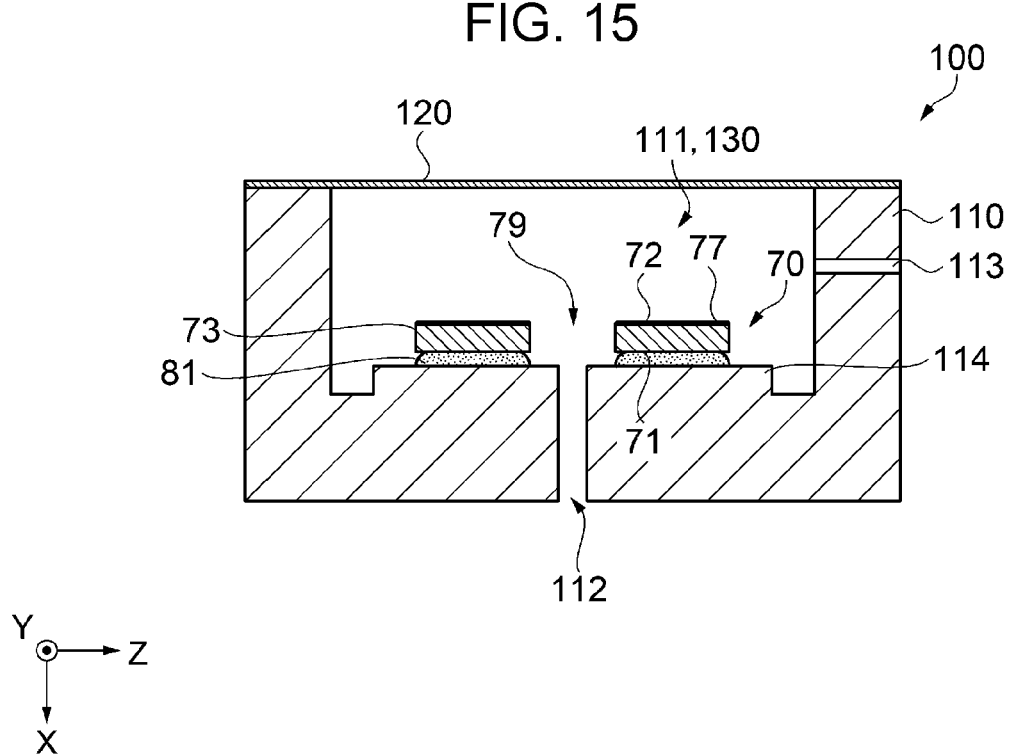
FIG. 15 is a schematic view illustrating an open state of an open/closed valve according to Embodiment 3.
Figure 16:
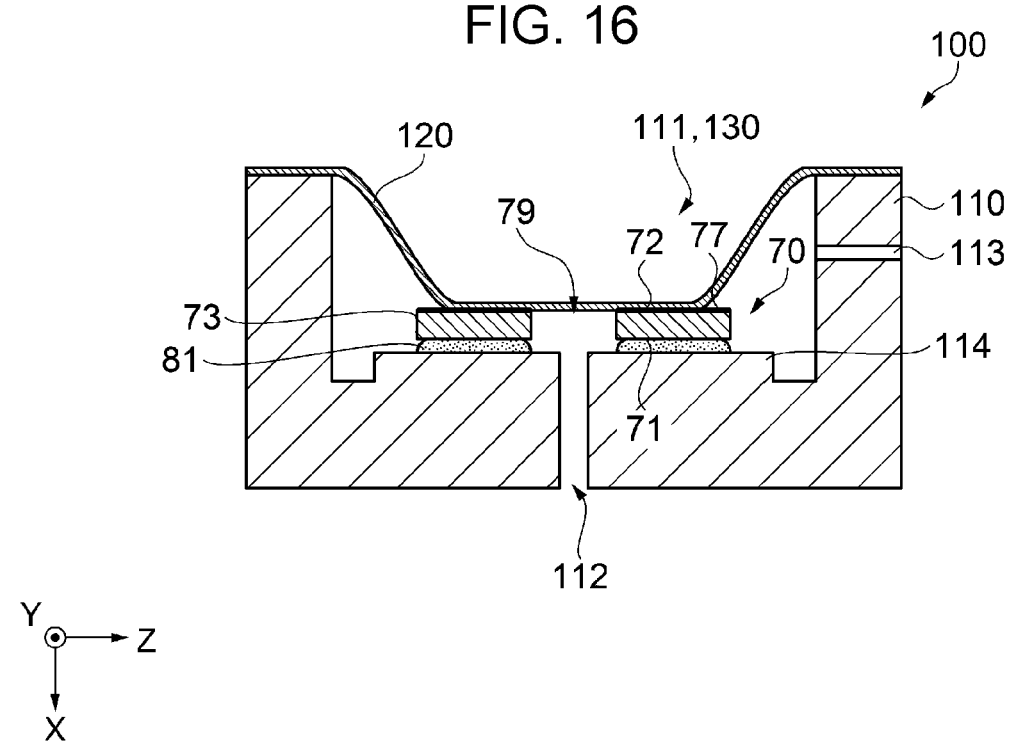
FIG. 16 is a schematic view illustrating a closed state of the open/closed valve according to Embodiment 3.

FIG. 15 is a schematic view illustrating an open state of an open/closed valve according to Embodiment 3. FIG. 16 is a schematic view illustrating a closed state of the open/closed valve according to the embodiment.

The printer 1 according to Embodiment 1 has a valve mechanism that opens/closes the flow path of an ink between the ink tanks 8 and the recording head 20 (the valve unit 50). The valve mechanism (the valve unit 50) is a mechanism for appropriately supplying an ink to the recording head 20, and is an open/closed valve that is opened to supply an ink to the recording head 20 when an ink is ejected from the recording head 20 and an ink pressure inside the recording head 20 declines and that is closed when an ink is supplied to the recording head 20 and an ink pressure inside the recording head 20 rises.

A printer according to the embodiment has another valve mechanism (an open/closed valve 100) between the ink tanks 8 and the valve unit 50. Another valve mechanism (the open/closed valve 100) is a mechanism for opening/closing a flow path of an ink linked to the recording head 20 when performing cleaning processing (choke cleaning processing).

That is, the printer according to the embodiment has a configuration where the open/closed valve 100 is added to the printer 1 according to Embodiment 1.

Hereinafter, the outline of the open/closed valve 100 will be described as a valve mechanism with reference to FIG. 15 and FIG. 16. The open/closed valve 100 is also an example of a "valve mechanism".

As illustrated in FIG. 15 and FIG. 16, the open/closed valve 100 has a valve seat 110, the opening member 70, and a film member 120, which is a valve body. The adhesive 81 is disposed between the valve seat 110 and the opening member 70.

The opening member 70 and the adhesive 81 have the same configurations as in Embodiment 1.

The valve seat 110 is a member formed of, for example, a thermoplastic resin, and has a recessed portion 111, a hole 112, an inflow path 113, and a projected portion 114. The recessed portion 111 is sealed with the film member 120, and a region enclosed with the recessed portion 111 and the film member 120 is an ink chamber 130. The hole 112 is connected to the inflow path 515 of the valve unit 50, and forms a part of the flow path of an ink, which communicates with the ink chamber 130 and the valve unit 50. The inflow path 113 is connected to the supply pipe 10, and communicates with the ink chamber 130 and the supply pipe 10.

The projected portion 114 is disposed on the inside of the recessed portion 111. The projected portion 114 is an alignment mark in a case where the opening member 70 is adhered to the valve seat 110. In addition, the hole 112 is provided so as to penetrate the center of the projected portion 114.

The film member 120 is, for example, a synthetic resin film, and has gas barrier performance and flexibility. The film member 120 is bonded to the recessed portion 111 of the valve seat 110 in a state where the atmospheric pressure is applied to an outer surface of the film member 120.

The opening member 70 has the same configuration as in Embodiment 1, and has the first surface 71, the second surface 72, the third surface 73 disposed on the outer edge of the opening member 70 which intersects the first surface and the second surface, and the opening 79 that penetrates the first surface 71 and the second surface.

The opening 79 communicates with the hole 112, and forms a part of the flow path of an ink, which communicates with the ink chamber 130 and the valve unit 50. The second surface 72 is covered with the water repellent film 77.

As in Embodiment 1, the inclined portions 45, which make an interval between the valve seat 110 and the first surface 71 long in the direction from the opening 79 to the third surface 73, may be provided. By do so, the adhesive 81 is likely to flow in the direction from the opening 79 to the third surface 73, and is unlikely to flow in the direction from the third surface 73 to the opening 79. For this reason, a possibility that the adhesive 81 flows to the side of the opening 79, and the opening 79 is blocked can be controlled. In addition, in the same manner, the first inclined surface 72A may be provided, and the first inclined surface 72A may not be covered with the water repellent film 77.

As illustrated in FIG. 15, the film member 120 separates away from the water repellent film 77 of the opening member 70, and a flow path of an ink ranging from the open/closed valve 100 to the valve unit 50 is opened when the opening 79 comes to an opened state.

As illustrated in FIG. 16, the film member 120 deflects in a direction of decreasing the volume of the ink chamber 130, for example, due to an outside force (compressed air, a cam mechanism, and the like), the film member 120 abuts against the water repellent film 77 of the opening member 70, and the flow path of an ink ranging from the open/closed valve 100 to the valve unit 50 is closed when the opening 79 is blocked.

As described above, the open/closed valve 100 is an open/closed valve that opens/closes by the film member 120 separating away from/abutting against the water repellent film 77 of the opening member 70. The water repellent film 77 is provided on a portion, from which the film member 120 separates away/against which the film member abuts, the portion, from which the film member 120 separates away/against which the film member abuts, repels an ink, and the accumulation of ink composition elements is controlled. Accordingly, a defect, in which an ink accumulates on the portion, from which the film member 120 separates away/against which the film member abuts, and blocking the opening 79 becomes difficult, can be controlled by the film member 120.

In the printer according to the embodiment, in a state where the open/closed valve 100 is closed, the cap 12 abuts against the recording head 20 and the inside of the cap 12 is sucked by the suction pump, and negative pressure piles up inside a flow path of an ink ranging from a valve-closed location (the opening 79) of the open/closed valve 100 to the nozzle openings 334 of the recording head 20. At a predetermined stage where negative pressure has sufficiently piled up, the open/closed valve 100 is set so as to be opened. An ink flows in from the upstream side at a stretch, and the ink, of which a flow rate is increased, instantaneously flows due to the opening of the open/closed valve 100 to release negative pressure piled up on the flow path on the downstream side of the opening 79 in the ink chamber 130. As a result, bubbles and foreign substances remaining in the ink chamber 130 and on a downstream flow path of the ink chamber are discharged at a stretch from the nozzle openings 334 of the recording head 20 along with an ink.

That is, in the printer according to the embodiment, the open/closed valve 100 is opened after negative pressure has sufficiently piled up inside the flow path of an ink, and choke cleaning processing, in which a gas remaining inside the flow path of an ink and a thickened ink are pushed out to the downstream side at a stretch, can be performed. For this reason, in the printer according to the embodiment, a gas remaining inside the flow path of an ink and a thickened ink can be more strongly discharged, compared to the printer according to Embodiment 1.

Although the open/closed valve 100 is provided at a place different from the valve unit 50 in the embodiment, a configuration where the open/closed valve 100 is provided in the valve unit 50 may be adopted. In addition, a film member is used in the embodiment but a member having flexibility may be used without being limited to the film member. For example, a rubber film, such as a butyl rubber film and a silicone rubber film, may be used. A rubber film can be mounted through a method of fitting a rubber film into a valve seat component and fixing with a fixing component. Using a rubber film is better in terms of high durability.

The invention is not limited to the embodiments, a change can be appropriately made in a range of not going against the gist or spirit of the invention that can be read from the scope of claims and the entire specification. Various modification examples may be considered in addition to the embodiments. Hereinafter, description will be given with modification examples.

Modification Example 1

FIG. 17A to FIG. 17E are schematic views illustrating disposition states of a valve seat and an opening member in a valve unit according to Modification Example 1. FIG. 17A to FIG. 17E schematically illustrate configuration elements necessary for description, and do not illustrate configuration elements unnecessary for description, thereby not illustrating the adhesive 81.

In addition, configuration parts that are the same as those of Embodiment 1 will be assigned with the same reference signs, and overlapping description will be omitted. The direction from the opening 79 to the third surface 73 in Embodiment 1 will be referred to as the Z-direction.

Hereinafter, preferable states of inclined portions 45A to 45E will be described with reference to FIG. 17A to FIG. 17E.

Figure 17A:
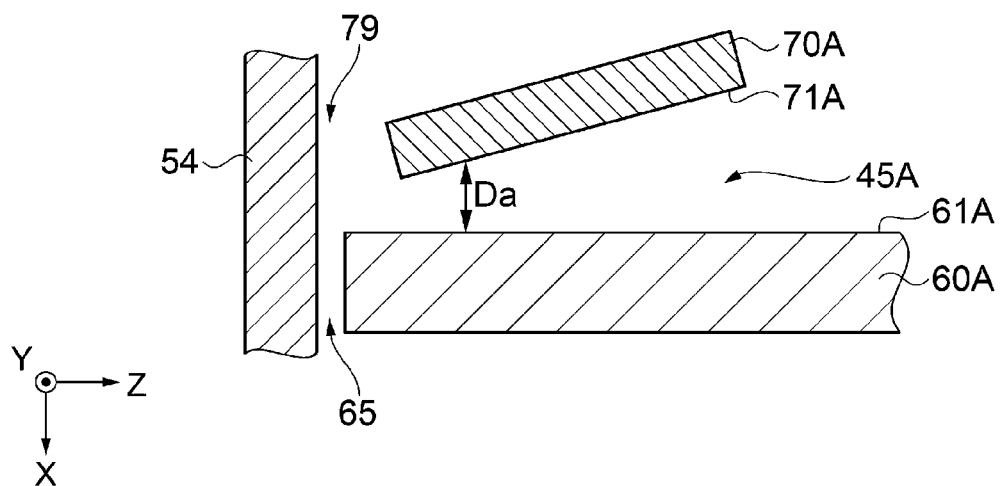
FIG. 17A is a schematic view illustrating disposition states of a valve seat and an opening member in a valve unit according to Modification Example 1.

As illustrated in FIG. 17A, a first surface 71A of an opening member 70A intersects the Z-direction and is inclined. A first surface 61A of a valve seat 60A is parallel to the Z-direction and is not inclined. The inclined portion 45A, which makes an interval Da between the first surface 61A (the valve seat 60A) and the first surface 71A (the opening member 70A) long in the Z-direction, is provided.

That is, the inclined portion 45A is formed over the entire first surface 71A of the opening member 70A.

With this configuration, in a process of pressure-bonding the valve seat 60A and the opening member 70A together (the process of Step S22 in Embodiment 1), a defect in which the adhesive 81 comes into contact with the valve body 54 can be prevented since the adhesive 81 disposed on the inclined portion 45A is likely to flow in the Z-direction and the adhesive 81 is unlikely to flow in a direction opposite to the Z-direction (a direction of facing the valve body 54), in a case where the interval Da between the valve seat 60A and the first surface 71A (the opening member 70A) is narrowed.

Figure 17B:
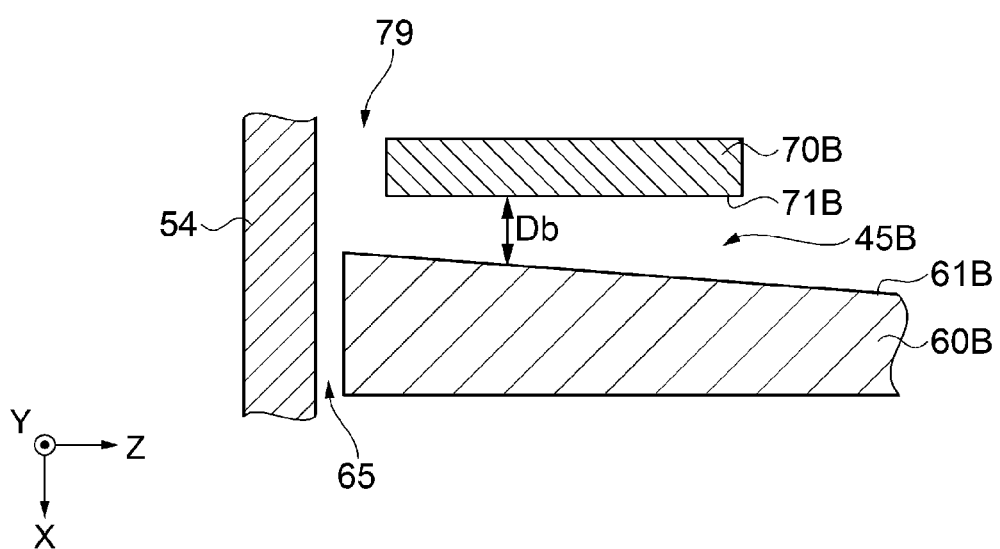
FIG. 17B is a schematic view illustrating the disposition states of the valve seat and the opening member in the valve unit according to Modification Example 1.

As illustrated in FIG. 17B, a first surface 71B of an opening member 70B is parallel to the Z-direction and is not inclined. A first surface 61B of a valve seat 60B intersects the Z-direction and is inclined. The inclined portion 45B, which makes an interval Db between the first surface 61B (the valve seat 60B) and the first surface 71B (the opening member 70B) long in the Z-direction, is provided.

That is, the inclined portion 45B is formed over the entire first surface 71B of the opening member 70B.

With this configuration, in a process of pressure-bonding the valve seat 60B and the opening member 70B together (the process of Step S22 in Embodiment 1), a defect in which the adhesive 81 comes into the valve body 54 can be prevented since the adhesive 81 is likely to flow in the Z-direction and the adhesive 81 disposed on the inclined portion 45B is unlikely to flow in the direction opposite to the Z-direction (the direction of facing the valve body 54), in a case where the interval Db between the valve seat 60B and the first surface 71B (the opening member 70B) is narrowed.

Figure 17C:
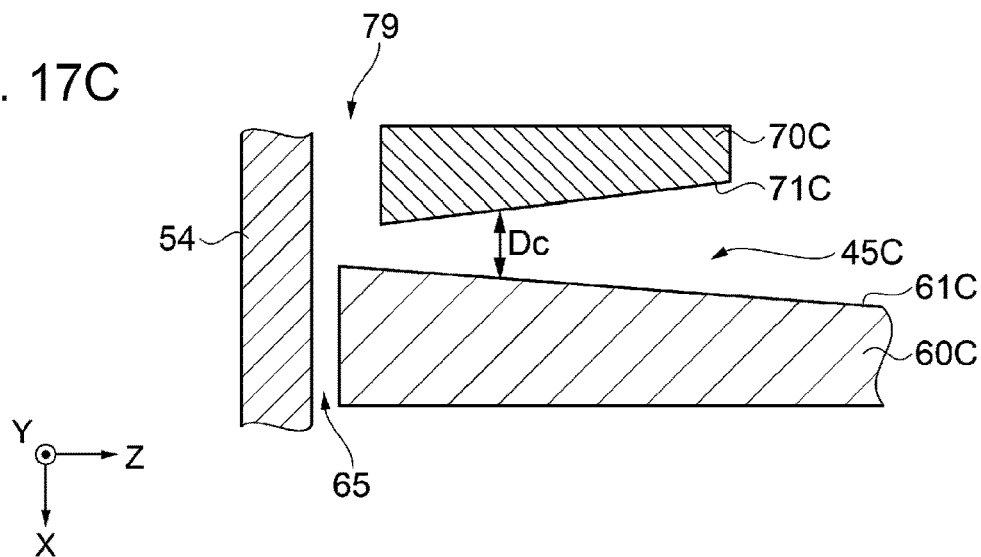
FIG. 17C is a schematic view illustrating the disposition states of the valve seat and the opening member in the valve unit according to Modification Example 1.

As illustrated in FIG. 17C, a first surface 71C of an opening member 70C intersects the Z-direction and is inclined. A first surface 61C of a valve seat 60C also intersects the Z-direction and is inclined. The inclined portion 45C, which makes an interval Dc between the first surface 61C (the valve seat 60C) and the first surface 71C (the opening member 70C) long in the Z-direction, is provided.

That is, the inclined portion 45C is formed on the entire first surface 71C of the opening member 70C.

With this configuration, in a process of pressure-bonding the valve seat 60C and the opening member 70C together (the process of Step S22 in Embodiment 1), a defect in which the adhesive 81 comes into the valve body 54 can be prevented since the adhesive 81 is likely to flow in the Z-direction and the adhesive 81 disposed on the inclined portion 45C is unlikely to flow in the direction opposite to the Z-direction (the direction of facing the valve body 54), in a case where the interval Dc between the valve seat 60C and the first surface 71C (the opening member 70C) is narrowed.

As described above, an inclined surface for providing the inclined portions 45A to 45C (the surface intersecting the Z-direction) may be provided at least one of the valve seats 60A to 60C and the opening members 70A to 70C.

Although the entire first surface 71A of the opening member 70A intersects the Z-direction and is inclined in FIG. 17A, a configuration where a part of a first surface 71D of an opening member 70D intersects the Z-direction and is inclined may be adopted.

Figure 17D:
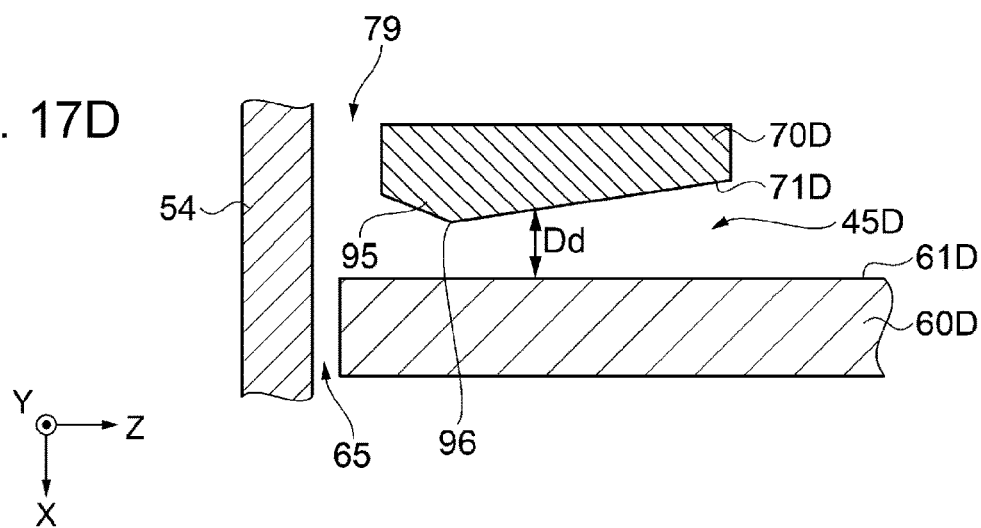
FIG. 17D is a schematic view illustrating the disposition states of the valve seat and the opening member in the valve unit according to Modification Example 1.

That is, as illustrated in FIG. 17D, a projected portion 95 is provided on the first surface 71D of the opening member 70D, and the first surface 71D is inclined in different directions with respect to the Z-direction, one being a Z-direction side and the other being a direction side opposite to the Z-direction with respect to a top portion 96 of the projected portion 95. Meanwhile, a first surface 61D of the valve seat 60D is parallel to the Z-direction and is not inclined.

With this configuration, the inclined portion 45D, which makes an interval Dd between the first surface 61D (the valve seat 60D) and the first surface 71D (the opening member 70D) long in the Z-direction, is provided on the Z-direction side with respect to the top portion 96 of the projected portion 95, and an inclined portion, which makes the interval Dd between the first surface 61D (the valve seat 60D) and the first surface 71D (the opening member 70D) long in the direction opposite to the Z-direction, is provided on the direction side opposite to the Z-direction with respect to the top portion 96 of the projected portion 95.

That is, the inclined portion 45D is partially formed on the first surface 71D of the opening member 70D.

In a process of pressure-bonding the valve seat 60D and the opening member 70D together (the process of Step S22 in Embodiment 1), a defect in which the adhesive 81 disposed on the Z-direction side with respect to the top portion 96 of the projected portion 95 comes into contact with the valve body 54 can be prevented since the adhesive 81 disposed on the Z-direction side with respect to the top portion 96 of the projected portion 95 is likely to flow in the Z-direction and the adhesive 81 disposed on the inclined portion 45D is unlikely to flow in the direction opposite to the Z-direction (the direction of facing the valve body 54), in a case where the interval Dd between the valve seat 60D and the first surface 71D (the opening member 70D) is narrowed.

Furthermore, a configuration where the projected portion 95 is provided on a first surface 61E of a valve seat 60E may be adopted.

Figure 17E:
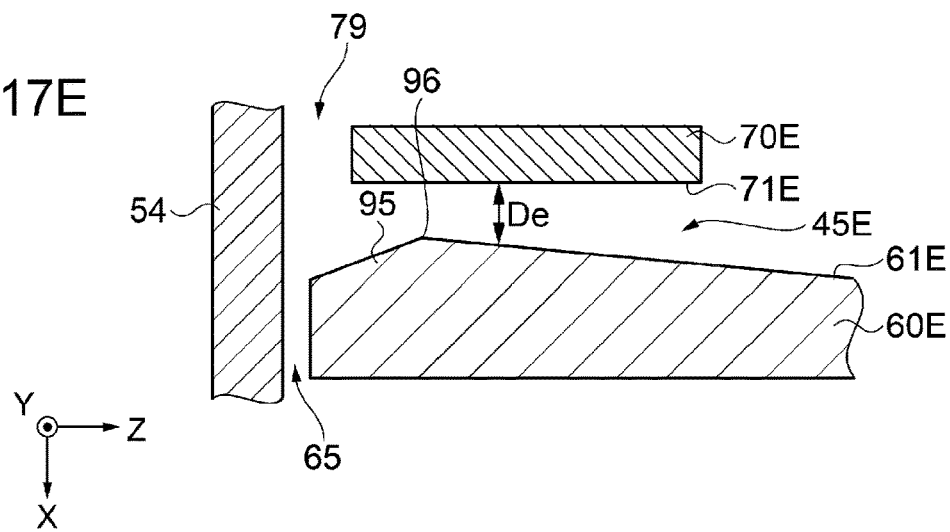
FIG. 17E is a schematic view illustrating the disposition states of the valve seat and the opening member in the valve unit according to Modification Example 1.

That is, as illustrated in FIG. 17E, the first surface 61E of the valve seat 60E has the projected portion 95, and is inclined in different directions, one being the Z-direction side with respect to the top portion 96 of the projected portion 95 and the other being the direction side opposite to the Z-direction. Meanwhile, the first surface 71E of the opening member 70E is parallel to the Z-direction and is not inclined.

With this configuration, the inclined portion 45E, which makes an interval De between the first surface 61E (the valve seat 60E) and the first surface 71E (the opening member 70E) long in the Z-direction, is provided on the Z-direction side with respect to the top portion 96 of the projected portion 95, and an inclined portion, which makes the interval De between the first surface 61E (the valve seat 60E) and the first surface 71E (the opening member 70E) long in the direction opposite to the Z-direction, is provided on the direction side opposite to the Z-direction with respect to the top portion 96 of the projected portion 95.

That is, the inclined portion 45E is partially formed on the first surface 71E of the opening member 70E.

In a process of pressure-bonding the valve seat 60E and the opening member 70E together (the process of Step S22 in Embodiment 1), a defect in which the adhesive 81 disposed on the Z-direction side with respect to the top portion 96 of the projected portion 95 comes into contact with the valve body 54 can be prevented since the adhesive 81 disposed on the Z-direction side with respect to the top portion 96 of the projected portion 95 is likely to flow in the Z-direction and the adhesive 81 disposed on the inclined portion 45E is unlikely to flow in the direction opposite to the Z-direction (the direction of facing the valve body 54), in a case where the interval De between the valve seat 60E and the first surface 71E (the opening member 70E) is narrowed.

The projected portion 95 may be provided both on the valve seat 60 and the opening member 70.

As described above, even if there are inclined portions, which make the intervals Dd and De between the valve seats 60D and 60E and the first surfaces 71D and 71E of the opening members 70D and 70E long in the direction opposite to the Z-direction (the direction of facing the valve body 54), between the valve seats 60D and 60E and the first surfaces 71D and 71E of the opening members 70D and 70E, the valve mechanisms fall in the technical scope of the application if the inclined portions 45D and 45E, which make the intervals Dd and De between the valve seats 60D and 60E and the first surfaces 71D and 71E of the opening members 70D and 70E long in the Z-direction, are provided.

The numbers of the inclined portions 45D and 45E, which make the intervals Dd and De between the valve seats 60D and 60E and the first surfaces 71D and 71E of the opening members 70D and 70E long in the Z-direction, may be singular numbers and may be plural numbers.

Similarly, the number of the inclined portions 45 in Embodiment 1 may be a singular number and a plural number. Places where the inclined portions 45 are formed in Embodiment 1 are not limited to the edge of the opening 79 and the outer edge of the opening member 70, and the inclined portions may be formed between the edge of the opening 79 and the opening member 70.

Modification Example 2

Although the opening member 70 is fixed to the valve seat 60 by means of the adhesive 81 in Embodiment 1, a configuration where the opening member 70 is fixed to the valve body 54 by means of the adhesive 81 may be adopted. In a case where the opening member 70 is fixed to the valve body 54, it is preferable that the seal portion 58 be fixed to the valve seat 60.

In the modification example, the opening member 70 fixed to the valve body 54 separates away from/abuts against the seal portion 58 fixed to the valve seat 60. A surface of the opening member 70, which is fixed to the main body portion 55 of the valve body 54, becomes the first surface 71, and a surface of the opening member 70 separating away from/abutting against the seal portion 58 fixed to the valve seat 60 becomes the second surface 72. With this configuration as well, the same effect as in Embodiment 1 can be obtained.

As described above, the first surface 71 of the opening member 70 is fixed to one of the valve seat and the valve body 54, and the second surface 72 of the opening member 70 may have a configuration of separating away from/abutting against the other one of the valve seat 60 and the valve body 54.

Modification Example 3

Figure 18:
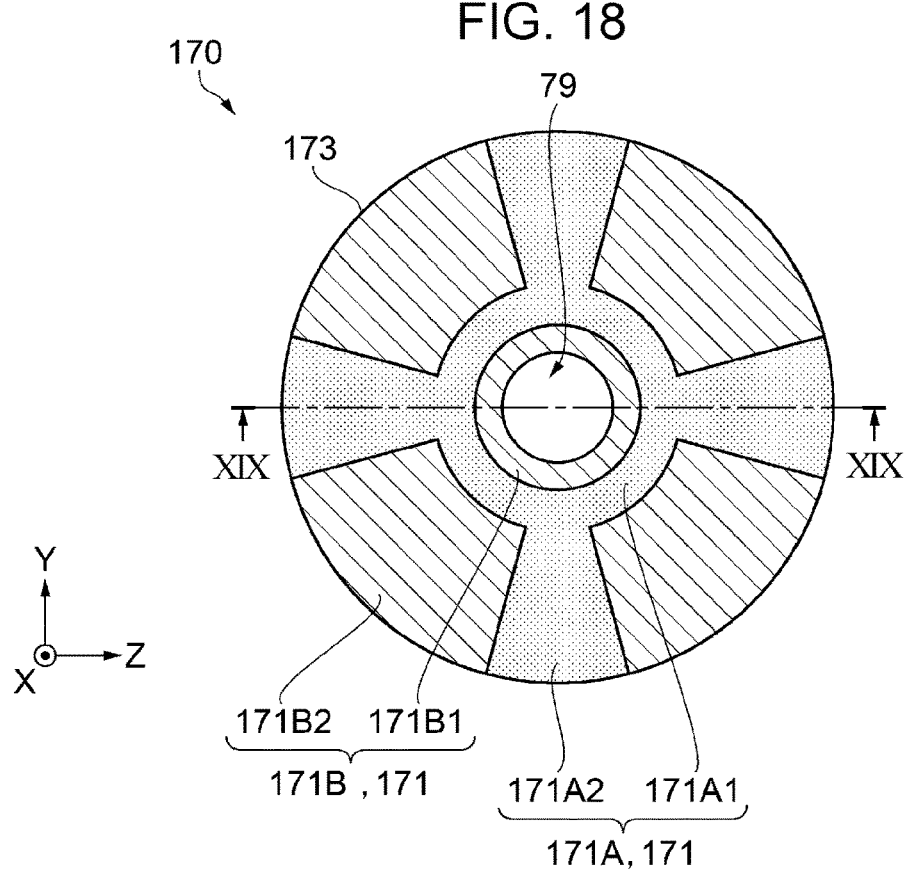
FIG. 18 is a schematic plan view illustrating a state of an opening member according to Modification Example 3.
Figure 19:
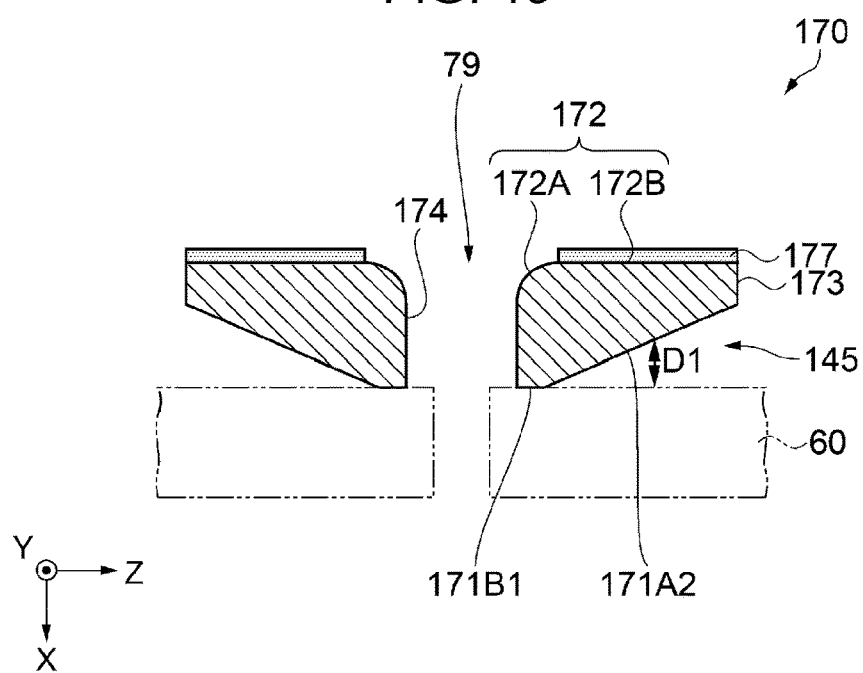
FIG. 19 is a sectional view of the opening member taken along line XIX-XIX of FIG. 18.

FIG. 18 is a schematic plan view illustrating a state of an opening member according to Modification Example 3. FIG. 19 is a sectional view of the opening member taken along line XIX-XIX of FIG. 18.

FIG. 18 illustrates a state of a first surface 171 of an opening member 170. In addition, FIG. 19 illustrates the valve seat 60 with two-dot chain lines.

In addition, configuration parts which are the same as those of Embodiment 1 will be assigned with the same reference signs, and overlapping description will be omitted.

As illustrated in FIG. 18 and FIG. 19, an outer edge of the opening member 170 according to Modification Example 3 is the same as the outer edge of the opening member 70 according to Embodiment 1, and is circular in plan view. The opening member 170 has the first surface 171 facing the valve seat 60, a second surface 172 disposed so as to face the first surface 171, a third surface 173 that intersects the first surface 171 and the second surface 172 and is disposed on the outer edge of the opening member 170, a fourth surface 174 disposed so as to face the third surface 173, and the opening 79 that penetrates the first surface 171 and the second surface 172.

The second surface 172 has a curved surface 172A bent in a direction from the first surface 171 to the second surface 172 on the edge of the opening 79, and an outer peripheral surface 172B that is disposed on a side opposite to the opening 79 with respect to the curved surface 172A. The outer peripheral surface 172B is covered with a water repellent film 177, and the water repellency thereof is improved compared to the curved surface 172A. The seal portion 58 of the valve body 54 separates away from/abut against the outer peripheral surface 172B covered with the water repellent film 177.

The first surface 171 has an inclined surface 171A, of which a distance D to the valve seat 60 is made long in a direction from the opening 79 to the third surface 173, and a flat surface 171B having substantially the same distance D to the valve seat 60. In FIG. 18, a region that is not shaded or hatched is the opening 79, a shaded region is the inclined surface 171A, and a hatched region is the flat surface 171B.

The flat surface 171B is disposed so as to be in contact with the valve seat 60. The flat surface 171B has a ring portion 171B1 that surrounds the opening 79 and four sector-shaped insular portions 171B2 disposed between the ring portion 171B1 and the third surface 173, in plan view.

The inclined surface 171A has a ring portion 171A1 that surrounds the ring portion 171B1 of the flat surface 171B (the opening 79) and extended portions 171A2 that extend in a direction from the ring portion 171A1 (the opening 79) to the third surface 173, in plan view. In addition, four extended portions 171A2 that extend in the direction from the opening 79 to the third surface 173 are disposed in the direction from the opening 79 to the third surface 173.

An inclined portion 145, which makes the interval D1 between the extended portions 171A2 of the opening member 170 and the valve seat 60 long, is formed both between the ring portion 171A1 of the opening member 170 and the valve seat 60 and between the extended portions 171A2 of the opening member 170 and the valve seat 60. The inclined portion 145 has a portion that surrounds the ring portion 171B1 (the opening 79) and a portion that extends in the direction from the opening 79 to the third surface 173 in plan view.

As described above, in the modification example, the inclined portion 145 has a shape different from that of the inclined portions 45 of Embodiment 1, in plan view. In the modification example, there is a portion, in which the ring portion 171A1 of the opening member 170 is in contact with the valve seat 60, between the inclined portion 145 and the opening 79 in plan view. This is one of differences from Embodiment 1.

In a process of pressure-bonding the valve seat 60 and the opening member 170 together (the process of Step S22 in Embodiment 1), the adhesive 81 disposed on the inclined portion 145 flows in the direction from the opening 79 to the third surface 173 and the adhesive 81 is unlikely to flow to the side of the opening 79, in a case where the interval between the valve seat 60 and the first surface 171 (the opening member 170) is narrowed.

Since the portion where the ring portion 171A1 of the opening member 170 is in contact with the valve seat 60 is disposed between the inclined portion 145 and the opening 79, the adhesive 81 is unlikely to flow to the side of the opening 79.

Modification Example 4

Figure 20:
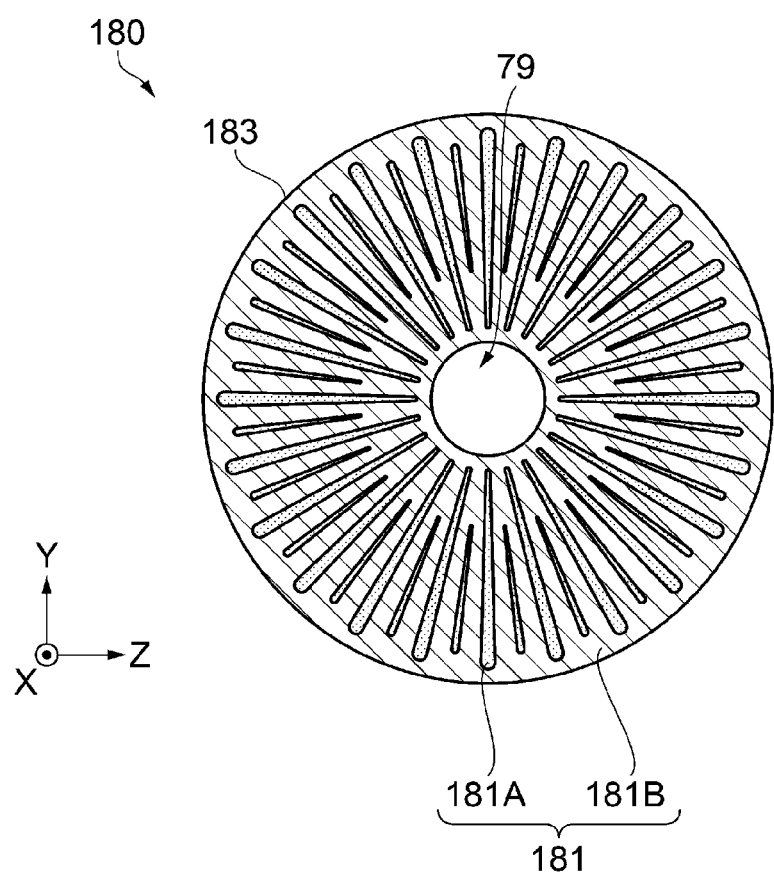
FIG. 20 is a schematic plan view illustrating a state of an opening member according to Modification Example 4.

FIG. 20 is a view corresponding to FIG. 18, and is a schematic plan view illustrating a state of an opening member according to Modification Example 4. FIG. 20 illustrates a state of a first surface 181 of an opening member 180.

In addition, configuration parts which are the same as those of Embodiment 1 will be assigned with the same reference signs, and overlapping description will be omitted.

As illustrated in FIG. 20, the opening member 180 of the modification example has the first surface 181, and a third surface 183 that intersects the first surface 181 and is disposed on the outer edge of the opening member 180, and the opening 79.

The first surface 181 of the opening member 180 is a surface facing the valve seat 60, and corresponds to the first surface 171 of the opening member 170 of Modification Example 3.

The first surface 181 of the opening member 180 has grooves 181A (the grooves 181A inclined in a direction from the opening 79 to the third surface 183), of which a distance to the valve seat 60 is made long in the direction from the opening 79 to the third surface 183 in plan view, and a flat surface 181B having substantially the same distance to the valve seat 60. That is, the grooves 181A in the first surface 181 correspond to the inclined surface 171A of the first surface 171 of Modification Example 3. The flat surface 181B of the first surface 181 corresponds to the flat surface 171B of the first surface 171 of Modification Example 3. In addition, in FIG. 20, a region that is not shaded or hatched is the opening 79, shaded regions are grooves 181A, and a hatched region is the flat surface 181B.

The grooves 181A radially extend in the direction from the opening 79 to the third surface 183 in plan view, and the plurality of grooves 181A are disposed. In the modification example, the inclined surface 171A (the ring portion 171A1) that surrounds the opening 79 in Modification Example 3 is not provided. More grooves 181A that extend in the direction from the opening 79 to the third surface 183 are formed in the modification example, compared to the number of the extended portions 171A2 of Modification Example 3, which extend in the direction from the opening 79 to the third surface 173.

These are differences between the modification example and Modification Example 3.

With this configuration as well, an inclined portion, of which a distance between the grooves 181A of the opening member 180 and the valve seat 60 is made long in the direction from the opening 79 to the third surface 183, is formed, and in a process of pressure-bonding the valve seat 60 and the opening member 180 together (the process of Step S22 in Embodiment 1), the adhesive 81 is likely to flow in the direction from the opening 79 to the third surface 183 and the adhesive 81 disposed on the inclined portion is unlikely to flow in a direction from the third surface 183 to the opening 79, in a case where the interval between the valve seat 60 and the first surface 181 (the opening member 180) is narrowed.

Instead of providing the grooves 181A that are inclined in the direction from the opening 79 to the third surface 183 in the first surface 181 of the opening member 180, a configuration where grooves that are not inclined in the direction from the opening 79 to the third surface 183 are provided may be adopted. That is, a configuration where grooves (flat grooves) having substantially the same distance to the valve seat 60 are provided may be adopted.

By radially forming a plurality of grooves having substantially the same distance to the valve seat 60 (the flat grooves) in the direction from the opening 79 to the third surface 183, the flow resistance of the adhesive 81 changes, and the adhesive 81 is likely to flow in the direction from the opening 79 to the third surface 183, and is unlikely to flow to the side of the opening 79.

In order to make the adhesive 81 likely to flow in the direction from the opening 79 to the third surface 183, it is preferable that the density of grooves having substantially the same distance to the valve seat 60 (the flat grooves) be increased in the direction from the opening 79 to the third surface 183. That is, it is preferable that the grooves having substantially the same distance to the valve seat 60 (the flat grooves) be more densely formed on a third surface 183 side than on the opening 79 side.

That is, flow path resistance between the opening member 180 and the valve seat 60 may gradually decrease from the opening 79 side to the third surface side depending on the shape, the number, or the density of the grooves. Consequently, the adhesive 81 can be made likely to flow to the third surface 183 side than to the opening 79 side.

Modification Example 5

The opening member 70 is configured of SUS and is fixed to the valve seat 60 by means of the adhesive 81 in Embodiment 1.

Both of the opening member 70 and the valve seat 60 may be configured of a thermoplastic resin, and a configuration where the opening member 70 is fixed to the valve seat 60 by means of heat welding or laser welding may be adopted. In the modification example, a bonding layer (melting layer), in which a resin configuring the opening member 70 and the valve seat 60 melted by heat from heat welding is mixed, is disposed between the opening member 70 and the valve seat 60. The bonding layer (melting layer) disposed between the opening member 70 and the valve seat 60 functions as a fixing member.

That is, a "fixing member" in the application includes a bonding layer (melting layer) in the modification example, in addition to the adhesive 81 described above.

With this configuration as well, the melted opening member 70 and the melted valve seat 60 can be made unlikely to flow to the side of the opening 79 in a case where the opening member 70 and the valve seat 60 melt due to heat from heat welding.

Modification Example 6

In addition, the embodiments and modification examples described above may be appropriately combined.

The entire disclosure of Japanese Patent Application No. 2016-168965, filed Aug. 31, 2016 is expressly incorporated by reference herein.

What is claimed is:
1. A valve comprising:
  a valve seat that has a first recessed portion, a second recessed portion, a partition that separates the first recessed portion and the second recessed portion and a hole which is provided on an inside of the first recessed portion and is configured as a flow path of a liquid;
  a valve body configured to open/close the flow path due to relative movement with respect to the valve seat;
  an opening member that has a first surface which is fixed to the valve seat, a second surface configured to separate away and abut the valve body, a third surface which intersects the first surface and the second surface, and an opening which penetrates the first surface and the second surface; and
  a fixing member that fixes the first surface to the valve seat,
  wherein the valve seat includes a projecting portion that projects from the partition into the first recessed portion and the first surface is fixed to the projecting portion.

2. The valve according to claim 1,
wherein the opening is disposed on the inside of the first recessed portion and the hole is disposed on an inside of the opening, in the case of viewing in a direction of the relative movement.

3. The valve according to claim 1, further comprising:
an inclined portion, which makes an interval between the valve seat and the first surface long in a direction from the opening to the third surface.

4. The valve according to claim 3,
wherein the inclined portion includes a first inclined portion disposed nearer to the opening than to the third surface, and a second inclined portion disposed nearer to the third surface than to the opening.

5. The valve according to claim 1,
the second surface further includes an inclined surface, which makes an interval to the valve seat long in a direction from the opening to the third surface, nearer to the opening than to the third surface.

6. The valve according to claim 5,
wherein the second surface further includes an outer peripheral surface disposed on a side of the third surface with respect to the inclined surface, and
the liquid repellency of the outer peripheral surface is higher than the inclined surface.

7. The valve according to claim 1, wherein the valve seat has a third recessed portion disposed in an inside of the projection portion, and the hole is provided on an inside of the third recessed portion.

8. The valve according to claim 7, wherein the third recessed portion includes an inner peripheral surface curved in a direction of approaching the valve body.

9. The valve according to claim 1, wherein
the second surface further includes an inner peripheral surface and an outer peripheral surface,
the inner peripheral surface is closer to the opening than the outer peripheral surface in a direction from the opening to the third surface, and
the liquid repellency of the outer peripheral surface is higher than the inner peripheral surface.

10. The valve according to claim 1, wherein
the valve body includes a seal portion that separates away from and abuts against the second surface, and
the projection portion projects in a direction that the seal portion separates away from the second surface.

11. A valve comprising:
a valve seat that has a recessed portion and a hole which is provided on an inside of the recessed portion and is configured as a flow path of a liquid;
a valve body configured to open/close the flow path due to relative movement with respect to the valve seat;
an opening member that has a first surface which is fixed to the valve seat, a second surface configured to separate away and abut the valve body, a third surface which intersects the first surface and the second surface, and an opening which penetrates the first surface and the second surface; and
a fixing member that fixes the first surface to the valve seat, wherein
the second surface further includes an inner peripheral surface and an outer peripheral surface,
the inner peripheral surface is closer to the opening than the outer peripheral surface in a direction from the opening to the third surface, and
the liquid repellency of the outer peripheral surface is higher than the inner peripheral surface.

* * * * *